(12) United States Patent
Tatsuzawa et al.

(10) Patent No.: US 7,781,129 B2
(45) Date of Patent: Aug. 24, 2010

(54) GREEN PIGMENT FOR COLOR FILTER, GREEN PIGMENT DISPERSION, PHOTOSENSITIVE COLOR COMPOSITION, COLOR FILTER, AND LIQUID CRYSTAL PANEL

(75) Inventors: Masahiro Tatsuzawa, Tokyo (JP); Shunsuke Sega, Tokyo (JP); Arata Kudou, Kamisu-machi (JP); Eiichi Kiuchi, Sawara (JP); Hiroshi Katsube, Tokyo (JP); Akitaka Nishio, Neyagawa (JP)

(73) Assignees: Dai Nippon Printing Co., Ltd., Tokyo-to (JP); Dic Corporation, Tokyo (JP)

( * ) Notice: Subject to any disclaimer, the term of this patent is extended or adjusted under 35 U.S.C. 154(b) by 1273 days.

(21) Appl. No.: 10/520,321

(22) PCT Filed: Jul. 23, 2003

(86) PCT No.: PCT/JP03/09344

§ 371 (c)(1),
(2), (4) Date: Oct. 27, 2005

(87) PCT Pub. No.: WO2004/010172

PCT Pub. Date: Jan. 29, 2004

(65) Prior Publication Data

US 2006/0098316 A1 May 11, 2006

(30) Foreign Application Priority Data

Jul. 24, 2002 (JP) ............................ 2002-215169
Jul. 16, 2003 (JP) ............................ 2003-275219
Jul. 16, 2003 (JP) ............................ 2003-275222

(51) Int. Cl.
*G02B 5/20* (2006.01)
*G02F 1/1335* (2006.01)
*G03F 7/00* (2006.01)

(52) U.S. Cl. .................. 430/7; 430/270.1; 349/106
(58) Field of Classification Search .................. None
See application file for complete search history.

(56) References Cited

U.S. PATENT DOCUMENTS 6,826,001 B2 * 11/2004 Funakura et al. ............ 359/885

FOREIGN PATENT DOCUMENTS

GB    1498054 A    1/1978

(Continued)

OTHER PUBLICATIONS

Computer-generated translation of JP 2003-161828 (Jun. 2003).*

*Primary Examiner*—John A. McPherson
(74) *Attorney, Agent, or Firm*—Ladas & Parry LLP

(57) ABSTRACT

A green pigment for a color filter including a phthalocyanine green pigment and capable of expressing a region of xy-chromaticity coordinate enclosed by predetermined equations 1, 2 and 3 defined by the XYZ color system of the CIE when the green pigment is soley subjected to colorimetry. Moreover, using the above-mentioned green pigment, it provides a photosensitive color composition capable of forming a color filter having a wide color reproduction range and a high transmittance. Furthermore, it provides a color filter having a wide color reproduction range and a high transmittance with a green pixel formed using the above-mentioned photosensitive color composition, and a liquid crystal panel using the color filter.

22 Claims, 6 Drawing Sheets

FOREIGN PATENT DOCUMENTS

| | | |
|---|---|---|
| JP | 50-130816 A | 10/1975 |
| JP | 63-123004 A | 5/1988 |
| JP | 09-171108 A | 6/1997 |
| JP | 09-269410 A | 10/1997 |
| JP | 2002-250812 A | 9/2002 |
| JP | 2003-161821 A | 6/2003 |
| JP | 2003-161828 A | 6/2003 |
| WO | WO02/14912 A1 | 2/2002 |
| WO | WO02/067022 A1 | 8/2002 |

\* cited by examiner

CIE CHROMATICITY COORDINATES

LIGHT SOURCE WAVEFORM

GREEN PIGMENT FOR COLOR FILTER, GREEN PIGMENT DISPERSION, PHOTOSENSITIVE COLOR COMPOSITION, COLOR FILTER, AND LIQUID CRYSTAL PANEL

This application is a U.S. National Phase of International Patent Application Serial No. PCT/JP03/09344, filed Jul. 23, 2003 which claims priority of Japanese Patent Application No. 2002-215169, filed Jul. 24, 2002, Japanese Patent Application No. 2003-275219, filed Jul. 16, 2003, and Japanese Patent Application No. 2003-275222, filed Jul. 16, 2003.

TECHNICAL FIELD

The present invention relates to a green pigment for a color filter, a pigment dispersion for a color filter containing the green pigment and a photosensitive resin composition, and a color filter using the same, and a liquid crystal panel.

BACKGROUND ART

A liquid crystal panel has a structure with a display side substrate and a liquid crystal driving side substrate facing with each other and a liquid crystal compound sealed therebetween for forming a thin liquid crystal layer. A liquid crystal display apparatus with such a liquid crystal panel assembled carries out the display by selectively changing the amount of the transmission light beam or the reflected light beam of the display side substrate in such manner that the liquid crystal drive side substrate of the liquid crystal panel electrically controls the liquid crystal arrangement in the liquid crystal layer.

For the liquid crystal panel, there are various driving methods such as the static drive method, the simple matrix method and the active matrix method. Recently, as a flat display for a personal computer, a personal digital assistant, or the like, a color liquid crystal display apparatus using a liquid crystal panel of the active matrix method or the simple matrix method has rapidly been spread. Each driving method has several driving modes. For example, in the case of the active matrix method, there are the driving modes such as the TN, the IPS, and the VA. A layered structure of the color filter varies according to the driving mode.

FIG. 1 is a configuration example of a liquid crystal panel of the active matrix method. A liquid crystal panel 101 has a structure produced by having a color filter 1 as the display side substrate and a TFT array substrate 2 as the liquid crystal driving side substrate face with each other so as to provide a gap part 3 of about 1 to 10 μm, filling the inside of the gap part 3 with a liquid crystal L, and sealing the circumference thereof with a sealing material 4. The color filter 1 has a structure with a black matrix layer 6 and a pixel part 7 formed in this order on a transparent substrate 5 from the side close to the transparent substrate, in which the black matrix layer 6 is formed in a predetermined pattern for blocking the light beam in the boundary part between the pixels and a pixel part 7 has a plurality of colors (in general, the three primary colors of red (R), green (G) and blue (B)) arranged in a predetermined order for forming the pixels or recently a pixel part may utilize the hologram. In general, the pixels are formed by applying a photosensitive colored resin composition prepared by dispersing and/or dissolving a color material in a photosensitive resin composition on a substrate and patterning by the photolithography. In this case, the photosensitive colored resin composition may either be of the positive type or the negative type. For the TN mode, a transparent electrode layer 9 is provided on the pixel part 7 or a protection layer 8. For the IPS mode, the protection layer 8 is provided on the pixel part, and the transparent electrode layer 9 may be formed on the side opposite to the pixel part 7 of the transparent substrate 5. Moreover, for the IPS mode, a resin black matrix is essential for the black matrix layer. For the VA mode, a transparent electrode is formed on the pixel part 7 or the protection layer 8 such that the transparent electrode may have a pattern formed. Particularly for the MVA mode, a projected substance called protrusion is formed on the transparent electrode 9.

On the other hand, a TFT array substrate 2 has a structure with TFT elements arranged and a transparent electrode layer provided on a transparent substrate (not shown). Moreover, an orientation layers 10 are provided on the color filter 1 and on the inner surface side of the TFT array substrate 2 facing thereto. In general, a back light is installed as the light source on the outer surface side of the TFT array substrate 2. Then, a color image can be obtained by controlling the light transmittance from the back light by a liquid crystal layer provided on the rear side of the pixels colored in each color. For the back light, a fluorescent pipe called three wavelength pipe or an LED is used mainly. The wavelength distribution of the F10 light source as one of the light sources using a three wavelength pipe is shown in FIG. 7 together with the wavelength distribution of a standard light source C.

As a method for maintaining the cell gap, there are a method of scattering a large number of spherical or bar like particle spacers 11 of a certain size, made of a glass, an alumina, a plastic, or the like as the spacer in the gap part 3, attaching the color filter 1 and the TFT array substrate 2, and injecting a liquid crystal as shown in FIG. 1, and a method of forming a columnar spacer 12 having a height corresponding to the cell gap in the area superimposed with the position with the black matrix layer 6 formed on the inner surface side of the color filter as shown in FIG. 2.

According to the liquid crystal display apparatus with the color filter of the above-mentioned structure assembled, a color image can be obtained by controlling the light transmittance of a liquid crystal layer provided on the rear side of each colored pixel which is arranged in a predetermined pattern.

For the advantage of saving the energy and the space, the liquid crystal display apparatus (LCD) attracts the attention as the display for substituting the conventional CRT monitor, and thus it is currently spread rapidly as a monitor for the OA appliance and the personal computer.

According to the spread of the internet and the portable phone, not only the character information but also the video and the image are distributed so that the images can be traded through the media such as the monitor of the personal computer, the printer, the digital camera and the scanner, and thus the common specification for the color space and the color reproduction compatible to the applications has become necessary. As a representative specification of the image signal transmittance method, there is the sRGB (international standard specification IEC61966-2-1).

It is the chromaticity of the three primary colors (image receiving three primary colors) of the image receiving unit that determines the color reproduction range of the multi media monitor. The three primary colors of the liquid crystal monitor of the sRGB specification are determined as follows as to the chromaticity coordinates x and y in the XYZ color system.

Red: x=0.64; y=0.33
Green: x=0.30; y=0.60
Blue: x=0.15; y=0.06

Moreover, recently, spread of the liquid crystal color televisions is accelerated according to the drop of the liquid crystal panel price. However, in the present situation, it is extremely difficult to provide the liquid crystal color television with the display performance comparable to that of the CRT.

For the color televisions, the shape, the movement and the hue of the object are reproduced on the image screen through the processes of the (1) image pick up (color camera), the (2) transmittance, and the (3) image receiving (image receiving unit), and the transmittance method for the image signal including the hue is standardized. As the representative ones of this method, there are the NTSC (National television system committee) and the EBU (European broadcasting union). The NTSC is adopted as the standard for the television broadcasting method in Japan, the United States, Canada, or the like, and the EBU is adopted in Europe.

It is the chromaticity of the three primary colors (image receiving three primary colors) of the image receiving unit that determines the color reproduction range of the color television, and the spectral characteristics that the color camera should have are also determined thereby. The image receiving three primary colors of the NTSC specification are determined as follows as to the chromaticity coordinates x and y in the XYZ color system.

Red: x=0.67; y=0.33
Green: x=0.21; y=0.71
Blue: x=0.14; y=0.08

On the other hand, the image receiving three primary colors of the EBU specification are determined as follows.

Red: x=0.64; y=0.33
Green: x=0.29; y=0.60
Blue: x=0.15; y=0.06 x=X/(X+Y+Z), y=Y/(X+Y+Z), and x, Y, Z are the three stimulus values in the XYZ color system.

However, in order to realize the excellent display performance of the color television, it is necessary that the color reproduction range satisfies the above-mentioned specification as well as that the screen is bright so that a sufficiently high transmittance is required. In the case of the CRT fluorescent substance, if the color reproduction range is widened too much, the transmittance is lowered extremely. Therefore, in the case of the CRT color television in the present situation, in order to ensure the necessary transmittance, the color reproduction range is sacrificed, and it is restrained to about 75% compared with the displayable space of the NTSC specification.

In order to provide the liquid crystal color television with the display performance comparable to the CRT, it is required that the color reproduction range satisfies the display specification for the color television as well as that the transmittance is sufficient. In order to realize the wide color reproduction range and the high transmittance, the combination of the spectral characteristics of the light source and the color reproduction ability of the color filter is important.

Although the bright line position of the light source spectrum differs depending on the back light manufacturers, the peak is provided at about 545 nm, with the sub bright lines present at the wavelengths before and after the same. Therefore, for the high transmission color filter, a pigment having a high transmittance at 545 nm and the vicinity thereof is required. For the high color purity color filter, a pigment having a narrow half bandwidth with the transmittance provided only at the main bright line is required. Therefore, for the color filters, there are the two kinds of the development element and the demand for the high transmittance and for the wide color reproduction range.

As to the green pixels for the color filter, capability of emitting a strongly yellowish green color is required in order to ensure the high transmittance in the wide color reproduction range. Among the specifications, for the sRGB specification compatible to the multi media monitor, a particularly strongly yellowish green pixel is required. Although a strongly yellowish green pixel is required also for the NTSC, EBU specifications compatible to the television, a bluish green setting is provided compared with the sRGB specification. However, in the case of adopting any display specification, it is extremely difficult to form a green pixel close to the green color of the three primary colors capable of ensuring a sufficient color reproduction range with a high brightness by only one kind of a green pigment. Then, in order to ensure a sufficient transmittance in a sufficient color reproduction range, it is desired to form a pixel having a high transparency with a high color strength while restraining the total use amount of the pigment by sufficiently developing the color in such manner that a green pigment having a high transmittance in the vicinity of 545 nm, which is the green wavelength while restraining the transmittance of the sub bright line is mainly used in combination with a yellow pigment having a high transparency.

As conventional green pigments for the green pixel of the color filter, C. I. pigment green 7 (hereinafter PG7) made of a chlorinated copper phthalocyanine pigment, and C. I. pigment green 36 made of a brominated copper phthalocyanine pigment (hereinafter PG36) have been used mainly. Although the PG7 has a strong green color strength, it has too strong a bluish tinge, a large amount of yellow needs to be mixed for having a green color for the pixels of the sRGB, NTSC and EBU specifications. Furthermore, since it has a low transmittance, a dark color filter is provided in the case the green pixels are formed mainly with the PG7. On the other hand, since the PG36 shows a relatively yellowish spectral transmittance spectrum and a wide half bandwidth with a wide spectral transmittance width in the vicinity of the peak top so as to transmit the bright line in the sub wavelength range, it shows an extremely high transmittance, however, it has a low color strength. Therefore, in order to form the green pixels for displaying a range with a high color strength (high density region) on the color coordinates, the PG36 pigment use amount is large so that the pixel transmittance becomes low. Even though there is a method of offsetting the color coordinates to the yellow direction by raising a concentration of the yellow pigment in order to ensure the high transmittance, such method requires large mount of the yellow pigment, thus total use amount of the pigment becomes larger. Therefore, a pigment capable of taking place of the conventional halogenated copper phthalocyanine pigments such as the PG7 and PG36 has been called for.

In general, in the case the composition ratio of pigment in the photosensitive color composition (photosensitive colored resist) is increased, the transparency of pixel is lowered so that the transmittance can hardly be raised. Moreover, in the case the composition ratio of pigment in the color filter forming photosensitive color composition is increased, the composition ratio of dispersing agent is increased as well so that the composition ratio of the components related to the film forming property such as the binder or the developing component becomes relatively small. In the case amount of the binder or the developing component is small, a problem is involved in that an adverse effect is posed to the minute pattern forming ability and the physical property of the pixels. Moreover, in the case of using a pigment having a low color strength, if the composition ratio of pigment in the photosensitive color composition is restrained, the film thickness needs to be made large for coloring. Also in the case of having a film thickness large, a problem is involved in that an adverse effect is posed to the minute pattern forming ability and the physical property of the pixels.

For example, in the case of producing a pixel minute pattern by the so-called pigment dispersing method, as to the minute pattern forming ability, performances such as no residue, no remaining foreign substances, a high resolution, an accurate shape after development and an even film thickness are required.

The residue is colored substances remaining at a portion whereat they should not remain after development. It may easily be generated in the case of a poor developing property for the reasons such as a large amount of the pigment or the dispersing agent. The foreign substance can be generated for the causes such as a partial lacking of the pixels in the case the curing component in the photosensitive color composition is little, and adhesion of the colored piece generated by the peeling phenomenon due to little developing component. In order to improve the resolution, patterns with many curved portions or corners unlike the conventional stripe patterns have appeared also for the color filter owing to the advancement of the liquid crystal driving method. Also for such a complicated pattern, accurate formation is required.

A problem is involved in that the shape after the development becomes an inverse trapezoid (inverse tapered shape) in the case the photosensitivity of the photosensitive color composition is poor. In the case the shape after the development is inverse trapezoidal, due to the tendency of lacking the pixel upper part by the hydraulic pressure at the time of the development, or the like, it provides the cause for the above-mentioned foreign substance generation. Furthermore, in the case of an inverse trapezoidal layer having a low heat resistance, a void may be formed after post baking due to sagging of a portion protruding like a hood by the heat. The void not only deteriorates the display quality but also lowers the resolution. Moreover, if the void portion bursts by the heat at the time of assembling the liquid crystal panel, the liquid crystal is polluted.

The evenness of film thickness does not cause a major problem at the individual pixel level. However, the substrate size keeps on enlarging for the purpose of the cost reduction, thus a meter class comes to be adopted. In that case, if the film thickness differs at the glass center and the end parts, the color becomes irregular so as to provide a defective product.

Moreover, as to the physical properties of the produced pixels, performances such as the hardness, the elasticity, and the impurity eluting property are required.

In order to form a high color purity liquid crystal display apparatus, it is preferable to provide a columnar spacer selectively in an opening area without using a spherical spacer, which deteriorates the display quality. However, even if a high hardness columnar spacer is formed, if the hardness or the elastic modulus of the pixel or the black matrix is poor, the cell gap evenness is deteriorated due to the deformation of foundation.

Therefore, even for the pixels, the high hardness and elastic modulus are required. However, if the composition ratio of the pigment or the dispersing agent in the photosensitive color composition is made larger and the binder amount is made smaller thereby, it is impossible to provide the sufficient hardness or elastic modulus to the pixels.

The impurity elution from the pixels causes the liquid crystal pollution. Since the liquid crystal does not perform the switching function only by the introduction of a small amount of the conductive impurities, it is important that the conductive molecules do not elute from the color filter to the liquid crystal layer. However, the conductive molecules are included as the impurities in the pigment or the dispersing agent used for the pixels. Therefore, it is important to restrain the impurity elution by scavenging the molecules with a dense mesh by raising the cross linking density of the layer.

On the other hand, Japanese Patent Application Laid-Open (JP-A) No. 2002-131521 discloses a composition for a color filter containing at least one kind of a phthalocyanine based pigment having as the central metal VO, Al-Z or In-Z (Z represents a halogen atom, a hydroxyl group, an alkoxy group or an aryloxy group). Moreover, JP-A No. 2002-162515 discloses a composition for a color filter containing as a color material C. I. pigment green 7 and/or C. I. pigment green 36, wherein the composition further contains a phthalocyanine based pigment having a maximum transmittance wavelength longer than that of the C. I. pigment green 7 and C. I. pigment green 36. However, the above-mentioned phthalocyanine pigment is used by mixing with the C. I. pigment green 7 and/or C. I. pigment green 36.

Moreover, as those disclosed after the earliest priority date of the present invention, there are the following three patent documents. JP-A No. 2002-250812 discloses a color composition for a color filter containing a green coloring material made of a halogenated copper phthalocyanine pigment and at least one kind of a halogenated different kind metal phthalocyanine pigment with the central metal selected from the group consisting of Mg, Al, Si, Ti, V, Mn, Fe, Co, Ni, Zn, Ge and Sn, with a 1 to 80 mole % content amount of the halogenated different kind metal phthalocyanine pigment based on the total amount of the green coloring material. The above-mentioned halogenated different kind metal phthalocyanine pigment is used as a mixture with the halogenated copper phthalocyanine.

JP-A No. 2003-161821 discloses a composition for a color filter containing a pigment, wherein the composition further contains one kind or two or more kinds of the phthalocyanine based compound selected from the group consisting of a phthalocyanine based compound having no central metal and a phthalocyanine based compound having a central metal other than the copper. It discloses that the above-mentioned phthalocyanine based compound is used by a relatively small amount.

JP-A No. 2003-161827 discloses a color filter characterized in that (1) a green pixel part contains a halogenated metal phthalocyanine pigment with 8 to 16 halogen atoms per one phthalocyanine molecule bonded with a benzene ring of the phthalocyanine molecule and (2) the green pixel part shows the maximum transmittance at 520 to 590 nm in the spectral transmittance spectrum in the whole range of visible light beam.

However, a green pigment having the excellent color strength and the high transmittance and a photosensitive color composition, which are capable of satisfying the purpose of forming a color filter having a wide color reproduction range and a high transmittance have not been known yet.

The present invention has been achieved in view of the circumstances, and a first object thereof is to provide a green pigment for a color filter, capable of displaying the chromaticity coordinates not to be displayed by the conventional green pigments, having the excellent color strength as a green color without too strong in a blue tinge, and a high transmittance.

Moreover, a second object of the present invention is to provide a photosensitive color composition using the above-mentioned green pigment, which is capable of forming a color filter having a wide color reproduction range and a high transmittance.

Moreover, a third object of the present invention is to provide a photosensitive color composition using the above-mentioned pigment, which is capable of getting closer to the green pixel of each specification with a relatively small amount of the pigment, thus having a high composition ratio of the reactive component and the excellent make-up property in printing.

Moreover, a fourth object of the present invention is to provide a photosensitive color composition using the above-mentioned green pigment, which is capable of forming a green pixel having a green color developing property with a sufficiently strong yellowish tinge even with a small mixing amount of a yellow pigment.

Moreover, a fifth object of the present invention is to provide a photosensitive color composition using the above-mentioned green pigment in combination with the other specific green pigment, which is capable of achieving the above-mentioned second to fourth objects by a thinner film thickness.

Moreover, a sixth object of the present invention is to provide a pigment dispersion using the above-mentioned green pigment, which is suitable for preparing the above-mentioned photosensitive color composition.

Moreover, a seventh object of the present invention is to provide a color filter with the green pixel formed using the above-mentioned photosensitive color composition, and a liquid crystal panel using the color filter, which have a wide color reproduction range and a high transmittance.

DISCLOSURE OF THE INVENTION

A green pigment according to the present invention is characterized in being comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source:

$$y=2.640Xx+0.080 \quad \text{(Equation 1)}$$

wherein $0.180<x<0.230$ in the Equation 1

$$y=5261.500Xx^4-6338.700xx^3+2870.400Xx^2-580.730Xx+44.810 \quad \text{(Equation 2)}$$

wherein $0.230<x<0.350$ in the Equation 2

$$y=-36.379Xx^3+37.410Xx^2-13.062Xx+1.970 \quad \text{(Equation 3)}$$

wherein $0.180<x<0.350$ in the Equation 3.

It is preferable that the above-mentioned phthalocyanine green pigment has a wavelength (Tmax) in a range of 500 to 520 nm at which a maximum transmittance in a spectrum of a spectral transmittance between 380 and 780 nm is provided.

Since a green pigment which is mainly made of a brominated zinc phthalocyanine can display the xy-chromaticity coordinate region enclosed by the above-mentioned Equations 1, 2 and 3, and thus it can be used preferably as a green pigment of the present invention.

It is preferable that the above-mentioned brominated zinc phthalocyanine contains less than 13 bromines on average per one molecule in terms of displaying the xy-chromaticity coordinate region enclosed by the above-mentioned Equations 1, 2 and 3.

When the above-mentioned green pigment according to the present invention is formed into a film form by solely using said green pigment itself and it is subjected to colorimetry using a F10 light source, it can display the xy-chromaticity coordinate region enclosed by the above-mentioned Equations 1, 2 and 3 defined by the XYZ color system of the CIE, so as to develop a green color of the chromaticity coordinate region which has not been displayed by the conventional green pigments, and thus the color reproduction range can be expanded compared with the case of using the conventional green pigments. Moreover, since the green pigment of the present invention is excellent in the color strength and thus it can get close to the green color defined by the specification by a small amount compared with the case of using the conventional brominated copper phthalocyanine pigment (PG36), the film thickness can be made thinner so that the make-up property in printing can be improved so as to facilitate the formation of the minute shape by the photolithography. Moreover, since the green pigment of the present invention has a high transmittance and thus the light transmission property of the color filter is made higher compared with the case of using a chlorinated copper phthalocyanine pigment (PG7) in the case of forming a color filter using the green pigment of the present invention, a strong back light is not needed any longer so that the cost increase of the liquid crystal panel or the increase of the electric power consumption can be restrained.

It is also possible to prepare the above-mentioned green pigment of the present invention preliminarily as a pigment dispersion before preparing the photosensitive color composition and mix the obtained pigment dispersion and a photosensitive component. In the case a brominated zinc phthalocyanine green pigment having a mean primary particle size within 0.01 to 0.1 μm is used as the green pigment of the present invention, the dispersing property to the colored resin, or the like is particularly preferable.

A photosensitive color composition for a color filter according to the present invention contains a reactive component related to the curing reaction and one or two or more coloring components including the above-mentioned green pigment of the present invention.

It is preferable that the above-mentioned green pigment for a color filter of the present invention is used as the main pigment for the above-mentioned photosensitive color composition in order to obtain a sufficient color developing property with a small amount of the pigment, and it is more preferable that the above-mentioned green pigment for a color filter according to the present invention is included more than 30% by weight in the above-mentioned coloring component. Moreover, it is preferable that the above-mentioned green pigment for a color filter is included by 50% by weight or more based on the total amount of the green pigment in the above-mentioned coloring component.

Moreover, a photosensitive color composition for a color filter according to the present invention comprises a reactive component related to a curing reaction and a coloring component including first and second green pigments, wherein the first green pigment is one kind selected from the group consisting of green pigments for a color filter each of which is comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source, and wherein the second green pigment is one kind selected from the group consisting of green pigments for a color filter each of which is comprised of a phthalocyanine green pigment and capable of expressing a region of xy-chromaticity coordinate enclosed by the following Equations 4, 5 and 6 defined by the XYZ color system of the CIE when the green pigment is solely subjected to colorimetry using a F10 light source;

$$y = 2.640Xx + 0.080 \quad \text{(Equation 1)}$$

wherein $0.180 < x < 0.230$ in the Equation 1

$$y = 5261.500Xx^4 - 6338.700Xx^3 + 2870.400Xx^2 - 580.730Xx + 44.810 \quad \text{(Equation 2)}$$

wherein $0.230 < x < 0.350$ in the Equation 2

$$y = -36.379Xx^3 + 37.410Xx^2 - 13.062Xx + 1.970 \quad \text{(Equation 3)}$$

wherein $0.180 < x < 0.350$ in the Equation 3

$$y = 8.000Xx - 1.513 \quad \text{(Equation 4)}$$

wherein $0.260 < x < 0.270$ in the Equation 4

$$y = -1051.300Xx^4 + 1176.900xx^3 - 450.880Xx^2 + 62.13Xx - 0.836 \quad \text{(Equation 5)}$$

wherein $0.260 < x < 0.350$ in the Equation 5

$$y = 5746.700Xx^4 - 7310.300Xx^3 + 3493.200Xx^2 - 744.610Xx + 60.251 \quad \text{(Equation 6)}$$

wherein $0.270 < x < 0.350$ in the Equation 6.

When the above-mentioned second green pigment is formed into a film form by solely using said green pigment itself, it can display a xy-chromaticity coordinate region enclosed by the following Equations 4, 5 and 6 defined by the XYZ color system of the CIE so as to develop a green color which has a high color strength with a strong yellowish tinge and also has a high transmittance. Since the above-mentioned second green pigment can emit a green color with a strong yellowish tinge in a chromaticity coordinate region, which cannot be expressed by the conventional halogenated copper phthalocyanine pigment, the color reproduction range can be widened to the yellowish region compared with the case of using the conventional green pigment so that the amount of the yellow pigment can be reduced for toning. Furthermore, since the above-mentioned second green pigment has a higher color strength compared with the PG36, it can get closer to the green color defined by the specification with a smaller amount compared with the case of using the PG36.

Therefore, when the above-mentioned first green pigment and the above-mentioned second green pigment are used in combination by optionally selecting them, a photosensitive color composition can achieve at a thinner film thickness: to form a color filter having a wide color reproduction range and a high transmittance; and/or to get closer to the green pixel of each specification with a relatively small amount of a pigment so as to have a high composition ratio of the reactive component and an excellent make-up property in printing; and/or to form a green pixel having a property capable of developing a green color with a sufficiently strong yellowish tinge even with a small mixing amount of the yellow pigment.

In particular, according to the above-mentioned first green pigment and the above-mentioned second green pigment, it is preferable that the central metals of the phthalocyanine green pigments are same for the good compatibility, that is, the same dispersing agent system can be used so that the dispersion stability is in a good condition at the time of mixing the same for providing the good color development. Furthermore, it is preferable that the above-mentioned first green pigment and the above-mentioned second green pigment are a brominated zinc phthalocyanine because the color strength and the transmittance can be made higher. It is particularly preferable that the brominated zinc phthalocyanine of the above-mentioned first green pigment has contains less than 13 bromines on average per one molecule, and the brominated zinc phthalocyanine of the above-mentioned second green pigment contains 13 or more bromines on average per one molecule. In particular, it is preferable that the mean primary particle size of the above-mentioned brominated zinc phthalocyanine is 0.01 to 0.1 μm.

According to the photosensitive color composition for a color filter according to the present invention, it is preferable that the weight ratio (b/a) of a non reactive component (b) other than the above-mentioned coloring component to the above-mentioned reactive component (a) is 0.45 or less.

According to the above-mentioned photosensitive color composition, since a sufficient color developing property can be obtained with a small amount of the pigment by using the above-mentioned green pigment according to the present invention, the use amount of the pigment and the dispersing agent for dispersing the pigment can be cut back so that the amount of the reactive component can be made larger relatively. Therefore, the photo setting property can be made preferable so that a green pixel having the excellent physical properties such as the film hardness after curing, the film elasticity after curing, the film thickness evenness, restraint of the pixel pattern lacking at the time of development, the residue reduction, the developing property improvement, improvement of a cross linking density of the layer after curing, and a reduction of the film thinness can be obtained.

The above-mentioned photosensitive color composition can develop a color sufficiently compatible to the high concentration type even at 0.25 to 1.0 in terms of a pigment/vehicle ratio, which is an extremely small amount of the pigment for the high concentration type photosensitive color composition, and thus forming a green pixel with a high concentration and a high transparency.

Moreover, for forming a green pixel, at least a yellow pigment can be contained in the above-mentioned photosensitive color composition together with the green pigment. In this case, since a sufficient color developing property can be obtained with the condition with a small amount of the yellow pigment of a 1.6 or less weight ratio of the yellow pigment to the green pigment (yellow pigment/green pigment), an use amount of the yellow pigment can be reduced as well.

To a color filter according to the present invention, a green pixel containing the above-mentioned green pigment of the present invention is provided. The green pixel can be produced using the above-mentioned photosensitive color composition of the present invention.

When the above-mentioned green pixel has a thickness of 2.7 μm or less and is solely subjected to colorimetry using a F10 light source, it can express a color space ranging $0.21 \leq x \leq 0.30$ in a x coordinate, $0.55 \leq y \leq 0.71$ in a y coordinate and $29 \leq Y$ in a stimulus value "Y" defined by the XYZ color system of the CIE. Therefore, a wide range of color reproduction can be ensured by combining with another color pixel as well as an extremely large transmittance can be provided even with a thin film thickness.

Moreover, the above-mentioned green pixel can make stronger in the yellowish tinge by mixing only a small amount of the yellow pigment, and thus even in the case the weight ratio of the above-mentioned yellow pigment to the green pigment containing the above-mentioned green pigment of the present invention in the pixel (yellow pigment/green pigment) is 1.6 or less, it is capable of expressing a region of xy-chromaticity coordinate ranging $0.21 \leq x \leq 0.30$ in a x coordinate and $0.55 \leq y \leq 0.71$ in a y coordinate defined by the XYZ system of the CIE when the green pixel is solely subjected to colorimetry using a F10 light source.

Moreover, in the case the above-mentioned green pixel contains at least a first green pigment and a second green pigment, wherein the first green pigment is one kind selected from the group consisting of green pigments for a color filter each of which is comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source, and wherein the second green pigment is one kind selected from the group consisting of green pigments for a color filter each of which is comprised of a phthalocyanine green pigment and capable of expressing a region of xy-chromaticity coordinate enclosed by the following Equations 4, 5 and 6 defined by the XYZ system of the CIE when the green pigment is solely subjected to colorimetry using a F10 light source, the pixel having a film thickness of 2.5 μm or less can express a color space ranging $0.25 \leqq x \leqq 0.32$ in a x coordinate, $0.55 \leqq y \leqq 0.75$ in a y coordinate and $30 < Y$ in a stimulus value "Y" defined by the XYZ color system of the CIE when the pixel is solely subjected to colorimetry using a F10 light source.

Moreover, in the case the above-mentioned green pixel contains a green pigment including the above-mentioned first and second green pigments and a yellow pigment at 1.6 or less in a weight ratio (yellow pigment/green pigment) of the above-mentioned yellow pigment to the above-mentioned green pigment, the pixel can express a region of xy-chromaticity coordinate ranging $0.25 \leqq x \leqq 0.32$ in a x coordinate and $0.55 \leqq y \leqq 0.75$ in a y coordinate defined by the XYZ color system of the CIE when the pixel is solely subjected to colorimetry using a F10 light source.

Moreover, since the above-mentioned green pixel has a high cross linking density, it has a 500 N/mm² or more hardness or a 20% or more elastic deformation, and thus it can hardly be deformed.

Moreover, the above-mentioned green pixel is not formed into an inverse tapered shape at the time of the development so that it can be formed in a tapered shape with a less than 1 ratio of the upper edge length with respect to the bottom edge length (upper edge/bottom edge) in a cross section of the pixel, and thus the pattern shape is preferable.

A liquid crystal panel according to the present invention comprises the above-mentioned color filter of the present invention and a liquid crystal driving side substrate facing with each other, and a liquid crystal sealed therebetween. By using the color filter of the present invention and a liquid crystal panel, a liquid crystal display apparatus capable of satisfying a region with a high color strength (high density region) of the color coordinates such as the multi media monitor display specification such as the sRGB and the color television display specifications such as the NTSC and the EBU can be produced.

Figure 1:
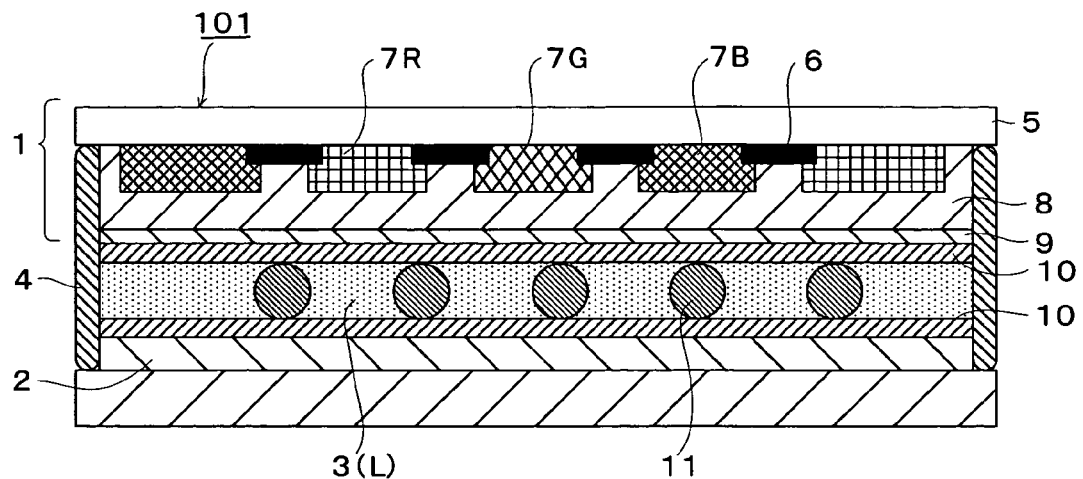
FIG. 1 is a schematic cross sectional view of an example of a liquid crystal panel.
Figure 2:
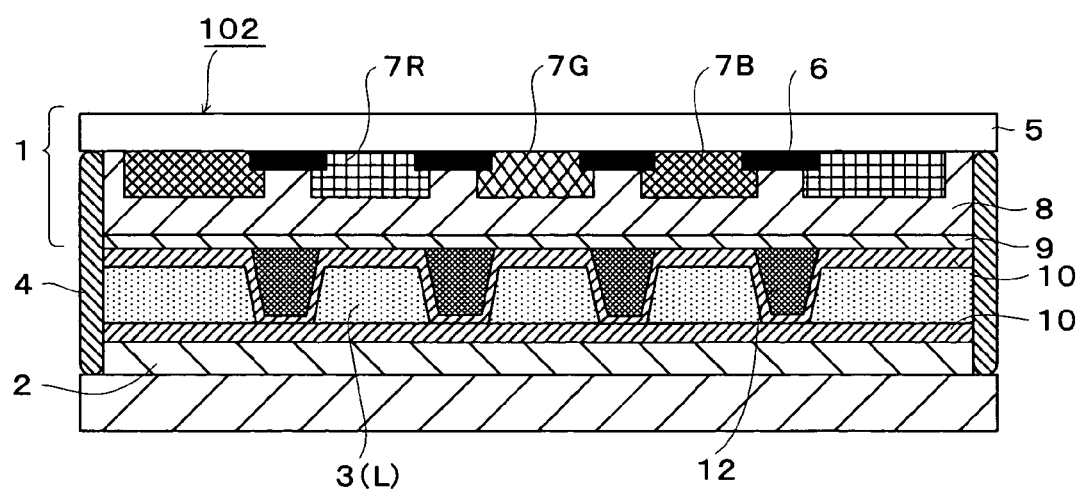
FIG. 2 is a schematic cross sectional view of another example of a liquid crystal panel.

Liquid crystal panel (101); liquid crystal panel (102); color filter (1); electrode substrate (2); gap part (3); sealing material (4); transparent substrate (5); black matrix layer (6); pixel part (7R, 7G, 7B); protection layer (8); transparent electrode layer (9); orientation layer (10); pearl (11); columnar spacer (12).

BEST MODE FOR CARRYING OUT THE INVENTION

Hereinafter, the present invention will be explained in detail. In the present invention, "(meth)acrylic" denotes either an acrylic group or a methacrylic group, and "(meth)acryloyl" denotes either an acryloyl group or a methacryloyl group. Moreover, the light beam includes an electromagnetic wave and a radioactive ray in the visible and non visible ranges. The radioactive ray includes for example a microwave and an electron beam. Specifically, it denotes an electromagnetic wave and an electron beam of a 5 μm wavelength or less.

Figure 3:
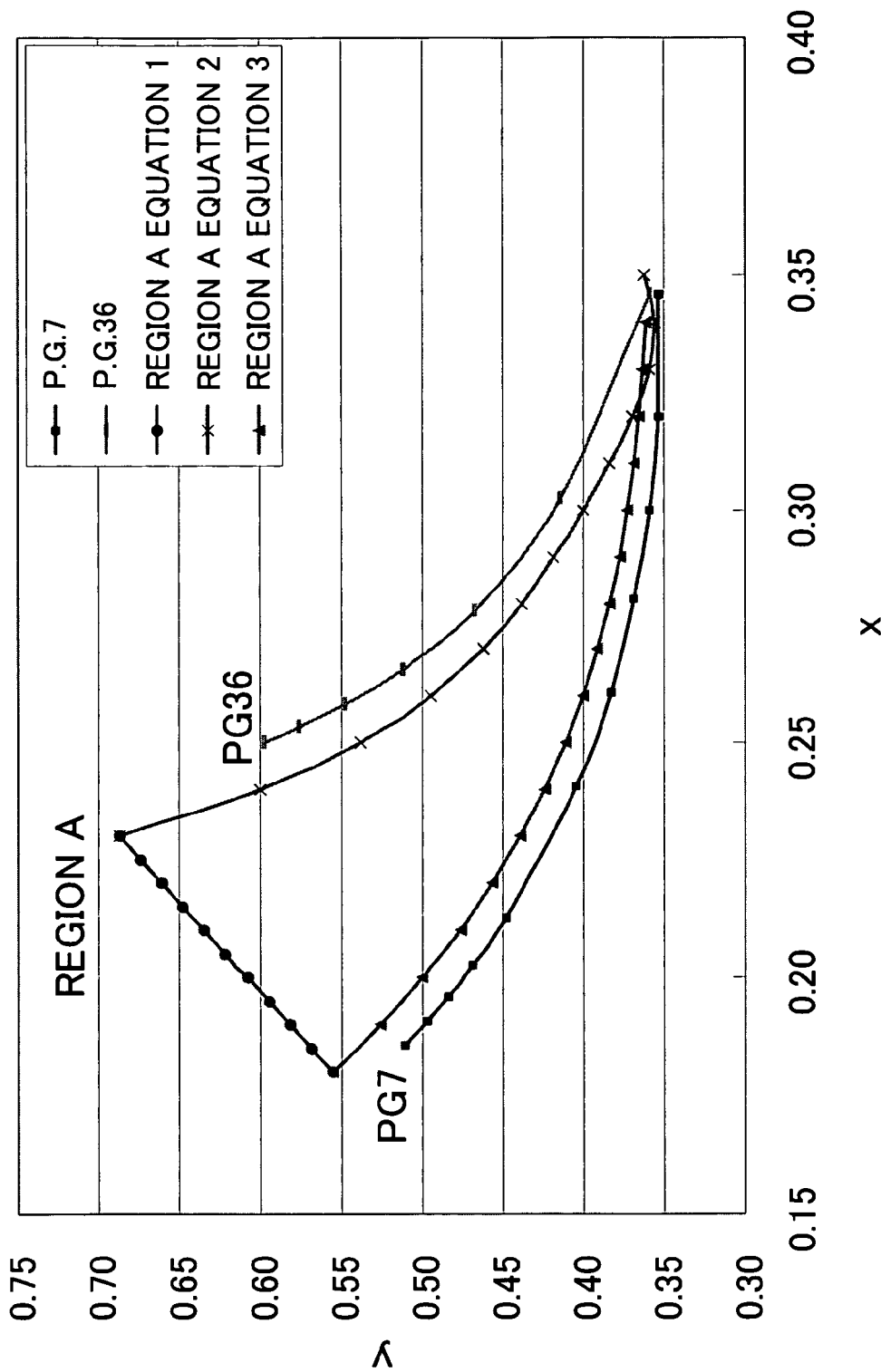
FIG. 3 is a graph showing the xy-chromaticity coordinate region (region A) to be expressed by the green pigment according to the present invention.

A green pigment for a color filter provided by the present invention is characterized in being comprised of a phthalocyanine green pigment and capable of expressing a region of xy-chromaticity coordinate enclosed by the following Equations 1, 2 and 3 defined by the XYZ color system of the CIE (hereinafter, it may be referred to as the "region A") when the green pigment is solely subjected to colorimetry using a F10 light source. The xy-chromaticity coordinate region (region A) enclosed by the Equations 1, 2 and 3 is shown in FIG. 3.

$$y = 2.640Xx + 0.080 \quad \text{(Equation 1)}$$

wherein $0.180 < x < 0.230$ in the Equation 1

$$y = 5261.500Xx^4 - 6338.700Xx^3 + 2870.400Xx^2 - 580.730Xx + 44.810 \quad \text{(Equation 2)}$$

wherein $0.230 < x < 0.350$ in the Equation 2

$$y = -36.379Xx^3 + 37.410Xx^2 - 13.062Xx + 1.970 \quad \text{(Equation 3)}$$

wherein $0.180 < x < 0.350$ in the Equation 3.

Figure 4:
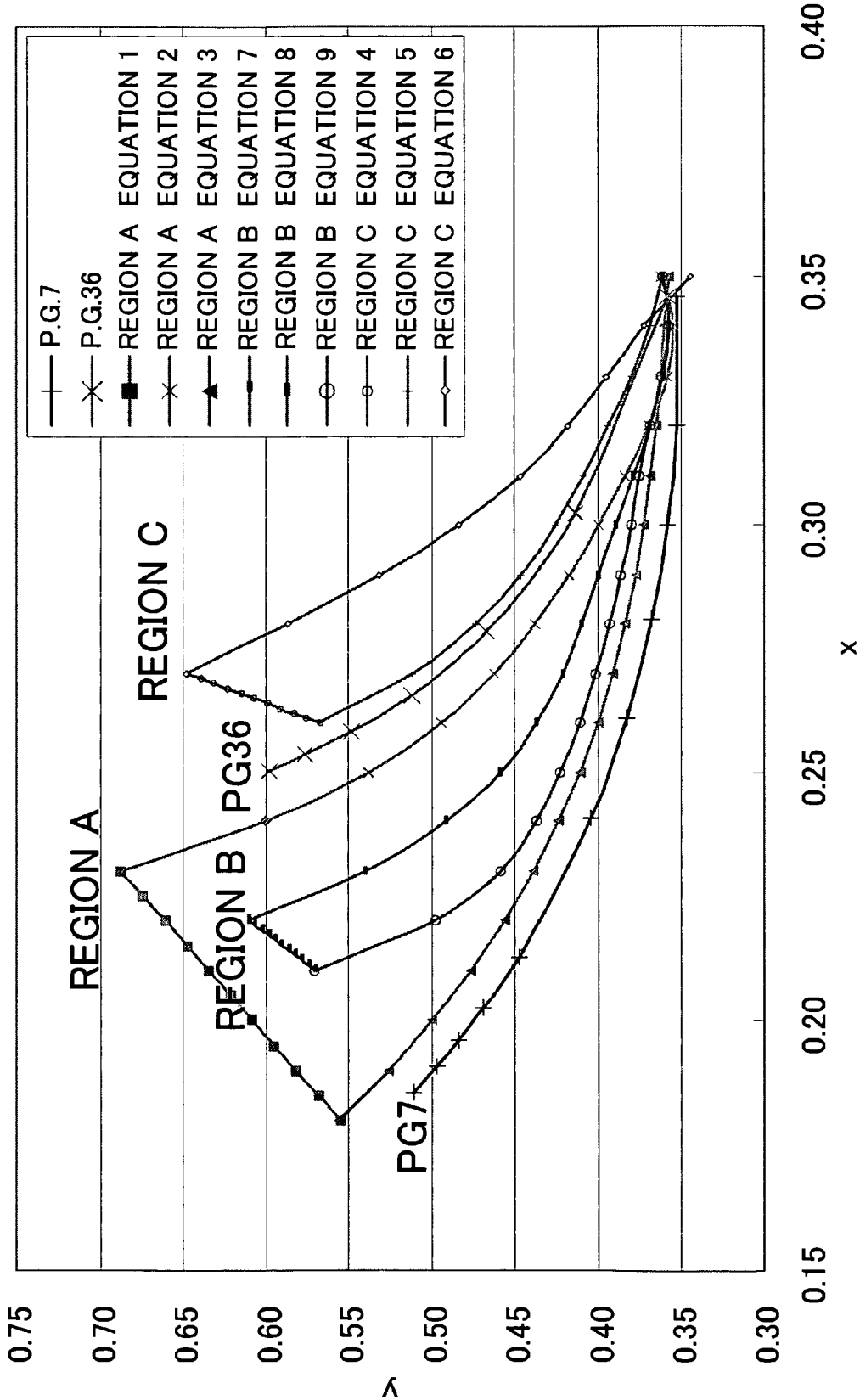
FIG. 4 is a graph showing the region A, the region B and the region C on the xy-chromaticity coordinate region.

The above-mentioned equations are for the expression defined by the XYZ color system of the CIE at the time of the colorimetry by the F10 light source. The F10 light source is a light source defined by the JIS Z 8719 (1984), which has a spectral spectrum similar to the light source for the back light for the television. Moreover, the colorimetry can be carried out by a microscope spectrophotometer (for example, OSP-SP200 microscope spectrophotometer produced by OLYMPUS CORPORATION) Among the xy-chromaticity coordinate region (region A) enclosed by the Equations 1, 2 and 3, a green pigment capable of expressing the xy-chromaticity coordinate region (hereinafter, it may be referred to as the "region B") enclosed by the following Equations 7, 8 and 9 defined by the XYZ color system of the CIE when the green pigment is solely subjected to colorimetry using a F10 light source is particularly preferable, because it does not provide too strong bluish tinge to cause no lowering of transmittance, or does not provide too strong yellowish tinge to cause no lowering of the color strength as a green color. The xy-chromaticity coordinate region (region B) enclosed by the Equations 7, 8 and 9 is shown in FIG. 4 together with the above-mentioned region A.

$y = 4.000Xx - 0.270$ (Equation 7)

wherein $0.210 < x < 0.220$ in the Equation 7

$y = 3849.200Xx^4 - 4595.600Xx^3 + 2056.300Xx^2 - 409.710Xx + 31.138$ (Equation 8)

wherein $0.220 < x < 0.350$ in the Equation 8

$y = 737462.022Xx^6 - 1267177.816Xx^5 + 904622.642Xx^4 - 343495.090xX^3 + 73187.274Xx^2 - 8299.969Xx + 392.073$ (Equation 9)

wherein $0.210 < x < 0.350$ in the Equation 9.

In view of allowing the phthalocyanine green pigment used in the present invention to express the xy-chromaticity coordinate region in the above-mentioned range, it is preferable that, when a transmittance in a spectral transmittance spectrum is 5% at a wavelength (Tmin) having a minimum transmittance, the wavelength (Tmax) at which a transmittance is maximum among a spectrum of a spectral transmittance between 380 and 780 nm is in a range of 500 to 520 nm. Furthermore, it is preferable that the transmittance at the above-mentioned wavelength (Tmax) is 90% or more, in particular 93% or more. Moreover, it is preferable that according to the phthalocyanine green pigment used in the present invention, the transmittance of the above-mentioned spectral transmittance spectrum at 435 nm as the wavelength of the blue light source of the F10 light source is 45% or less, and in particular, 40% or less. Furthermore, it is preferable that the transmittance of the above-mentioned spectral transmittance spectrum at 610 nm as the wavelength of the red light source of the F10 light source is 20% or less, in particular, 10% or less. The spectral transmittance spectrum can be measured using the microscope spectrophotometer (for example, OSP-SP200 microscope spectrophotometer produced by OLYMPUS CORPORATION).

As the central metal for the phthalocyanine green pigment used in the present invention, Zn, Mg, Al, Si, Ti, V, Mn, Fe, Co, Ni, Ge, Sn, or the like can be presented. In particular, Zn (zinc) is preferable for the high color strength and transmittance and the capability of expressing the xy-chromaticity coordinate region of the above-mentioned range. The zinc is suitable for expressing a green color in a region with a high color strength of the color coordinates (high density region) such as a specifications for the multi media monitor display including the sRGB or for the color television display including the NTSC and the EBU, in particular, it is extremely suitable for expressing a green color for the television specifications such as the NTSC and the EBU.

Since a zinc phthalocyanine has 16 hydrogen atoms in one molecule, if the hydrogen atoms are substituted by a bromine atom and a chlorine atom, theoretically total 136 kinds of substitution products can be produced within the range of 0 to 16 bromine atoms, 0 to 16 chlorine atoms and 0 to 16 hydrogen atoms. In particular, since a green pigment made of a brominated zinc phthalocyanine can express a xy-chromaticity coordinate region enclosed by the above-mentioned Equations 1, 2 and 3, it can be used preferably as the above-mentioned green pigment for a color filter of the present invention. Among the brominated zinc phthalocyanines, a brominated zinc phthalocyanine having in average 8 or more and less than 13 bromine atoms in one molecule has a good color strength as a green color without too strong a bluish tinge and develops a green color with a high transmittance, and thus it is extremely suitable for forming a green pixel for a color filter. In particular, a brominated zinc phthalocyanine having in average 10 to 12 bromine atoms in one molecule and more particularly a brominated zinc phthalocyanine having in average 10 to 11 bromine atoms in one molecule is preferable.

Such a brominated zinc phthalocyanine pigment can be produced by a known production method disclosed in JP-A No. 50-130816, or the like. For example, a method of synthesizing a pigment optionally using as a starting material a phthalic acid or a phthalodinitrile with a part or the entirety of the hydrogen atoms of an aromatic ring substituted by a halogen atom such as a bromine and a chlorine can be presented. In this case, a catalyst such as an ammonium molybdate can be used as needed.

As another method, a method of brominating with a bromine gas a zinc phthalocyanine in a molten product of a mixture of an aluminum chloride, a sodium chloride, a sodium bromide, or the like of about 110 to 170° C. can be presented. According to this method, a ratio of the various kinds of brominated zinc phthalocyanines having different bromine contents can be controlled optionally by adjusting the ratio of the chloride and the bromide in the molten salt and changing the chlorine gas introduction amount or the reaction time.

By placing the obtained mixture into an acidic aqueous such as a hydrochloric acid after finishing the reaction, the produced brominated zinc phthalocyanine is precipitated. Thereafter, by executing the post processes such as filtration, washing and drying, a brominated zinc phthalocyanine can be obtained.

Then, the brominated zinc phthalocyanine pigment is subjected to the dry pulverization as needed in a pulverizing machine such as an attriter, a ball mill, a vibration mill and a vibration ball mill, and subsequently subjected to a solvent salt milling method, a solvent boiling method, or the like to be converted into a pigment, and thus obtaining a brominated zinc phthalocyanine pigment having the excellent dispersion property and color strength, and capable of emitting a green color with a high brightness can be obtained. The pigment producing method is not particularly limited. Although a step for converting into the pigment can be carried out simultaneously with a step for dispersing the brominated zinc phthalocyanine to the dispersion medium, it is preferable to adopt the solvent salt milling process for the capability of easily restraining the crystal growth and obtaining the pigment particles having a large specific surface area compared with the solvent process of heating and agitating the brominated zinc phthalocyanine in a large amount of an organic solvent.

The solvent salt milling method denotes kneading and pulverizing the brominated zinc phthalocyanine as a crude pigment immediately after the synthesis, an inorganic salt and an organic solvent. Specifically, the crude pigment, the inorganic salt and the organic solvent not to dissolve the same are placed in a kneading machine, and the kneading and pulverizing operation is executed. As the kneading machine at the time, for example, a kneader, a mix mauler, or the like can be used.

As the above-mentioned inorganic salt, a water soluble inorganic salt can be used preferably. It is preferable to use an inorganic salt such as a sodium chloride, a potassium chloride and a sodium sulfate. Moreover, it is more preferable to use an inorganic salt having a 0.5 to 50 µm average particle size. Such an inorganic salt can be obtained easily by finely pulverizing an ordinary inorganic salt.

In the case of obtaining the brominated zinc phthalocyanine pigment having a 0.01 to 0.1 µm average particle size of the primary particles, it is preferable to set an use amount of inorganic salt with respect to an use amount of the crude pigment in the solvent salt milling to large. That is, the use amount of the inorganic salt is preferably 5 to 20 parts by weight with respect to 1 part by weight of the crude pigment, and it is more preferably 7 to 15 parts by weight. In the present invention, the average particle size of the primary particles is the value obtained by photographing the particles in the visual field with a transmission type electron microscope JEM-2010 (produced by JEOL (JAPAN ELECTRON OPTICS LABORATORY CO., LTD)), measuring a longer diameter (the major axis) of the pigment primary particle comprising an agglomerate for each of 50 particles on the two dimensional image, and calculating the average thereof. At the time, the pigment as the specimen is photographed with a microscope after the ultrasonic dispersion of the same in a solvent. Moreover, a scanning type electron microscope may be used instead of the transmission type electron microscope.

As to the organic solvent, it is preferable to use an organic solvent capable of restraining the crystal growth. As such an organic solvent, a water soluble organic solvent can be used preferably. For example, a diethylene glycol, a glycerol, an ethylene glycol, a propylene glycol, a liquid polyethylene glycol, a liquid polypropylene glycol, a 2-(methoxy methoxy) ethanol, a 2-butoxy ethanol, a 2-(isopentyloxy) ethanol, a 2-(hexyloxy) ethanol, a diethylene glycol monomethyl ether, a diethylene glycol monoethyl ether, a diethylene glycol monobutyl ether, a triethylene glycol, a triethylene glycol monomethyl ether, a 1-methoxy-2-propanol, a 1-ethoxy-2-propanol, a dipropylene glycol, a dipropylene glycol monomethyl ether, a dipropylene glycol monomethyl ether, a dipropylene glycol, or the like can be used. The use amount of the water soluble organic solvent is not particularly limited, and it is preferably 0.01 to 5 parts by weight with respect to 1 part by weight of the crude pigment.

As to the method for producing the brominated zinc phthalocyanine pigment, although only the crude pigment may be processed by the solvent salt milling, it is also possible to execute the solvent salt milling while using the brominated zinc phthalocyanine and a phthalocyanine derivative. Moreover, the phthalocyanine derivative may be added at the time of synthesizing the crude pigment or after converting into the pigment, however, it is more preferable to add the same before the process converting into the pigment such as the solvent salt milling. By adding the phthalocyanine derivative, the improvement of the viscosity characteristic of a resist ink for a color filter and the improvement of the dispersion stability of the same can be achieved.

As such a phthalocyanine derivative, although any one known and used commonly can be used, the phthalocyanine pigment derivatives represented by the following general formula (I) or (II) are preferable:

$P-(Y)_m$  General formula (I):

$P-(A-Z)_n$  General formula (II):

wherein P represents a residue given by subtracting n pieces of hydrogens of an unsubstituted or halogenated phthalocyanine ring having a central metal or no central metal. Y represents a primary to tertiary amino group, carboxylic acid group, a sulfonic acid group, or a salt thereof with a base or a metal. A represents a divaleic linking group, Z represents a residue given by subtracting at least one hydrogen on a nitrogen atom of a primary to secondary amino group, or a residue given by subtracting at least one hydrogen on a nitrogen atom of a heterocycle including a nitrogen. "m" represents 1 to 4, and "n" represents 1 to 4.

As the above-mentioned central metal, for example, divaleic to trivaleic metals such as a copper, a zinc, a cobalt, a manganese and an aluminum can be presented. As the above-mentioned primary to secondary amino group, for example, a monomethyl amino group, a dimethyl amino group, a diethyl amino group, or the like can be presented. Moreover, as the above-mentioned base or metal to form a salt with a carboxylic acid group or a sulfonic acid group, for example, an organic base such as an ammonia, a dimethyl amine, a diethyl amine and a triethyl amine, and a metal such as a potassium, a sodium, a calcium, a strontium, and an aluminum can be presented. As the divaleic linking group of A, for example, a divaleic linking group such as an alkylene group having 1 to 3 carbon atoms, $—CO_2—$, $—SO_2—$, and $—SO_2NH(CH_2)_m—$ can be presented. Then, as Z, for example, a phthalimide group, a monoalkyl amino group, a dialkyl amino group, or the like can be presented.

The phthalocyanine derivatives to be added are, in general, 0.01 to 0.3 part by weight per 1 part by weight of the crude pigment. In the case of using the phthalocyanine derivative, the total amount of the crude pigment and the phthalocyanine derivatives is regarded as an use amount of the crude pigment, and then an use amount of the inorganic salt or the like is selected in the above-mentioned range.

The temperature at the time of the solvent salt milling is preferably 30 to 150° C., and it is more preferably 80 to 120° C. The time of the solvent salt milling is preferably 5 hours to 20 hours, and it is more preferably 6 to 18 hours.

According to the solvent salt milling, a mixture mainly containing a brominated zinc phthalocyanine pigment, an inorganic salt, and an organic solvent can be obtained. By eliminating the organic solvent and the inorganic salt from the mixture, and as needed carrying out the washing, the filtrating, the drying, the pulverizing or the like of the solid substance mainly containing the brominated zinc phthalocyanine pigment, powders of the brominated zinc phthalocyanine pigment can be obtained. For the washing operation, either washing with cold water or washing with hot water can be adopted. As to the number of the washing operation, it can be repeated in a range of one time to five times. In the case of the above-mentioned mixture using a water soluble inorganic salt and a water soluble organic solvent, the organic solvent and the inorganic salt can be eliminated easily by washing with cold water.

For the above-mentioned drying operation after filtration and washing, for example, a batch type or continuous type drying operation for dehydrating and/or eliminating the solvent of the pigment by heating at 80 to 120° C. using a heating source installed in a drying machine, or the like can be presented. As the drying machine, in general, there are a box type drying machine, a band drying machine, a spray drier, or the like. Moreover, the pulverization after drying is not an operation for enlarging the specific surface area or making smaller the average particle size of the primary particles, but it is to be executed for disassembling the pigment so as to be powders at the time the pigment forms a lamp, or the like in the case of the drying operation using for example a box type drying machine or the band drying machine. For example, pulverization by a mortar, a hammer mill, a disc mill, a pin mill, a jet mill, or the like can be presented.

Accordingly, a brominated zinc phthalocyanine pigment having a 0.01 to 0.1 µm average particle size of the primary particles can be obtained.

The green pigment of the present invention represented by the brominated zinc phthalocyanine pigment can be used for any application known and used commonly. In particular, the pigment having a 0.01 to 0.1 µm average particle size of the primary particles provide a better dispersion property to the synthetic resin to be colored, or the like. The above-mentioned brominated zinc phthalocyanine pigment has a weaker agglomerating force between the primary particles compared with the conventional pigments so that it has a nature to be disassembled easily. By an electron microscope photograph, individual primary particles comprising an agglomerate, which has not been observed for the conventional pigments, can be observed.

Moreover, in the case of using for a color filter, especially with the average particle size of the primary particles in a range of 0.01 to 0.1 μm, the pigment agglomeration is relatively weak so that the pigment can be dispersed into a resist ink for a color filter easily so that a color filter having both high clearness and transmittance can be obtained easily. Moreover, the light blocking property at 365 nm, which is used frequently at the time of curing the resist ink for a color filter is lowered so that the photo curing sensitivity of the resist cannot be lowered and the film thickness reduction or the pattern running can hardly be generated at the time of the development, and thus it is preferable.

In the case the green pigment of the present invention has a 1 to 3 vertical and lateral aspect ratio of the primary particles, the viscosity characteristics can be improved in various application fields so that the flowability is made higher. For finding the aspect ratio, as in the case of finding the average particle size of the primary particles, the pigment particles in the visual field are photographed by the transmission type electron microscope or the scanning type electron microscope. Then, the average values of the longer diameter (major axis) and the shorter diameter (minor axis) are found for 50 pieces of the pigment primary particles comprising an agglomerate on the two dimensional image, and calculation is carried out using these values.

When the above-mentioned green pigment of the present invention is formed into a film form with the sole use of said green pigment, the region of xy-chromaticity coordinate enclosed by the following Equations 1, 2 and 3 defined by the XYZ color system of the CIE can be expressed, so that it can develop a green color having an excellent color strength without too strong a bluish tinge and a high transmittance, which cannot be expressed by the conventional green pigment, thereby widening the color reproduction range compared with the case of using the conventional green pigments. As a result, the above-mentioned green pigment according to the present invention provides a pigment having the advantages of both the conventional chlorinated copper phthalocyanine pigment (PG7) and brominated copper phthalocyanine pigment (PG36).

Since the green pigment of the present invention has the excellent color strength, compared with the case of using the conventional PG36, it can get closer to the green color defined by the specification with a small amount so as to make the film thickness thinner, and thus the make-up property in printing is improved for facilitating the formation of the minute shape by the photolithography. Moreover, the green pigment of the present invention does not have too strong a bluish tinge. Accordingly, even if a mixing amount of yellow pigment is small, a green pixel having a green color developing property with a sufficiently strong yellowish tinge and/or a thin green pixel having a high transparency and an excellent color purity can be formed, and furthermore, the color reproduction range can be widened by a thin film thickness compared with the case of using the conventional green pigments. Moreover, since the green pigment of the present invention has a high transmittance, in the case of forming a green pixel using it in combination with a yellow pigment, the transmittance can be made higher by a thin film thickness compared with the conventional ones also in the region with a high color strength in the color coordinate (high density region). Therefore, in the case of forming a color filter using the green pigment of the present invention, a color filter having a wide color reproduction range and a high transmittance can be formed. Since the light transmission property of the color filter is made higher compared with the case of forming the color filter from the conventional photosensitive color composition using the PG7, a strong back light is not needed any longer so that the cost increase of the liquid crystal panel or the increase of the electric power consumption can be restrained. Since the green pigment according to the present invention emits a green color having a relatively strong bluish tinge, it is suitable especially for the NTSC, EBU specifications for the television, which require a green pixel having a relatively strong bluish tinge.

Moreover, in the case the green pigment according to the present invention is comprised of a brominated zinc phthalocyanine pigment, a high transmittance can be provided, and furthermore, the above-mentioned transmittance of the spectral transmittance spectrum at a 435 nm wavelength is 45% or less, in particular, 40% or less so that a pigment with little extra bluish tinge, which should be eliminated by toning, can be obtained. Moreover, the above-mentioned transmittance of the spectral transmittance spectrum at 610 nm is 20% or less, in particular, 10% or less so that a pigment with little reddish tinge after toning can be obtained.

For the colorimetry after forming a film with the sole use of the green pigment according to the present invention, a coating solution is prepared by appropriately adding a dispersing agent, a binder component and a solvent to the green pigment so as to apply the same to a transparent substrate, dry and cure as needed. As to the binder component, a non-curing type thermoplastic resin composition may be used, or a photo curing (photosensitive) or thermosetting type resin composition may be used as long as a transparent coating layer adaptable to the colorimetry can be formed. Moreover, by using a composition eliminating the other pigments from the photosensitive colored resin composition of the present invention to be described later, a coating layer containing as the pigment only the green pigment according to the present invention can be formed for executing the colorimetry.

A green pixel for a color filter can be formed using the green pigment of the present invention by a known method. As to the green pixel production method, for example, a green pixel can be formed by preparing a photosensitive color composition by mixing the green pigment according to the present invention with a photosensitive component such as a photo polymerizable compound and a photo polymerization initiating agent, applying the same to a transparent base material, and exposing into a predetermined pattern for the development. Additionally, a color filter may be produced by any method to form a green pattern, such as an electrodeposition method, a transfer method, a micelle electrolytic method, a PVED (photovoltaic electrodeposition) method, or the like. A red pattern and a blue pattern can be formed by the same method using a known pigment.

Before preparing a photosensitive color composition, it is also possible to preliminarily prepare a pigment dispersion of the green pigment, and mix the obtained pigment dispersion with a photosensitive component. In this case, a photosensitive color composition having good pigment dispersion property can be obtained.

Moreover, although the green pigment for a color filter according to the present invention can be used alone as a coloring component, in general, it is toned in combination use with another pigment such as a yellow pigment at the stage of preparing a pigment dispersion or a photosensitive color composition. Since the green pigment for a color filter of the present invention has the excellent color strength as a green color with not excessively strong a bluish tinge, and a high transmittance, it can be used preferably as the main pigment in the coloring component in a pigment dispersion or a photosensitive color composition for a color filter, and more preferably, as the main pigment of the green pigment in the coloring component. In terms of forming the green pixel for a color filter having a wide color reproduction range and a high transmittance, it is preferable that the green pigment of the present invention is contained by 30% by weight or more based on the total amount of the coloring component in the photosensitive color composition, furthermore, 39% by weight or more, and in particular, 50% by weight or more.

Moreover, it is preferable that the green pigment of the present invention is contained by 50% by weight or more based on the total amount of the green pigment in the coloring component in the photosensitive color composition, and furthermore, 60% by weight or more. Furthermore, depending on the color coordinates to be targeted, it may be sufficient to restrain the other green pigments to be extremely small addition amount, so that adjusting to the targeted color coordinates can be attained even if the composition amount of the green pigment of the present invention is 80% by weight or more, further 100% by weight based on the total amount of the green pigments.

In the case of preparing a pigment dispersion or a photosensitive color composition, in terms of getting closer to the green pixel color of each specification with a relatively small pigment use amount, making higher the transmittance, making thinner the film thickness and widening the color reproduction range, it is preferable that the above-mentioned coloring component contains, as a first green pigment, one kind selected from the group consisting of the above-mentioned green pigments for a color filter according to the present invention and, as a second green pigment, a green pigment having a stronger yellowish tinge compared with the first green pigment.

As to the first green pigment selected from the above-mentioned green pigments for a color filter according to the present invention, in particular, a green pigment capable of expressing the above-mentioned region B can be used more preferably since it does not have too strong a bluish tinge so as not to lower the transmittance, and does not have too strong a yellowish tinge so as not to lower the color strength as a green color.

The second green pigment having a stronger yellowish tinge than the first green pigment has a wavelength (Tmax), at which transmittance is maximum among a spectrum of a spectral transmittance between 380 and 780 nm, longer than that of the first green pigment. It is further preferable that the second green pigment gives the gap between the first green pigment and the second green pigment on the xy-chromaticity coordinate region so as that difference in the x-direction is 0.02 or more, in particular 0.02 to 0.05 with y fixed at y=0.50, in terms of providing the effects of getting closer to a color of the green pixel of each specification with a relatively small pigment use amount and widening the color reproduction range. As long as the above-mentioned conditions are satisfied, the second green pigment may be selected from the above-mentioned green pigments for a color filter according to the present invention, or it maybe selected from the green pigments having a stronger yellowish tinge than the green pigments for a color filter according to the present invention in the case of requiring a green pixel having a wider color range or a stronger yellowish tinge.

In this case, as the green pigments having a stronger yellowish tinge than the green pigments for a color filter of the present invention, those not expressing the xy-chromaticity coordinate region enclosed by the above-mentioned Equations 1, 2 and 3, and having a wavelength (Tmax), at which a maximum transmittance is presented among a spectrum of a spectral transmittance between 380 and 780 nm, is larger than 515 nm and smaller than 535 nm or less are preferable. In particular, those having a wavelength (Tmax) in a range of 520 nm to 535 nm are further preferable.

Furthermore, it is preferable that the photosensitive color composition of the present invention comprises a reactive component related to a curing reaction and a coloring component including first and second green pigments, wherein the first green pigment is one kind selected from the group consisting of green pigments for a color filter each of which is comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source, and wherein the second green pigment is one kind selected from the group consisting of green pigments for a color filter each of which is comprised of a phthalocyanine green pigment and capable of expressing a region of xy-chromaticity coordinate enclosed by the following Equations 4, 5 and 6 defined by the XYZ color system of the CIE when the green pigment is solely subjected to colorimetry using a F10 light source. The xy-chromaticity coordinate region (region C) enclosed by the below-mentioned Equations 4, 5 and 6 is shown in FIG. 4 together with the above-mentioned xy-chromaticity coordinate region (region A) enclosed by the below-mentioned Equations 1, 2 and 3.

$$y = 2.640Xx + 0.080 \quad \text{(Equation 1)}$$

wherein $0.180 < x < 0.230$ in the Equation 1

$$y = 5261.500Xx^4 - 6338.700Xx^3 + 2870.400Xx^2 - 580.730Xx + 44.810 \quad \text{(Equation 2)}$$

wherein $0.230 < x < 0.350$ in the Equation 2

$$y = -36.379Xx^3 + 37.410Xx^2 - 13.062Xx + 1.970 \quad \text{(Equation 3)}$$

wherein $0.180 < x < 0.350$ in the Equation 3

$$y = 8.000Xx - 1.513 \quad \text{(Equation 4)}$$

wherein $0.260 < x < 0.270$ in the Equation 4

$$y = -1051.300Xx^4 + 1176.900Xx^3 - 450.880Xx^2 + 62.131Xx - 0.836 \quad \text{(Equation 5)}$$

wherein $0.260 < x < 0.350$ in the Equation 5

$$y = 5746.700Xx^4 - 7310.300Xx^3 + 3493.200Xx^2 - 744.610Xx + 60.251 \quad \text{(Equation 6)}$$

wherein $0.270 < x < 0.350$ in the Equation 6.

The green pigments capable of expressing the above-mentioned region C at the time of being solely subjected to colorimetry using a F10 light source can emit a green color having a high color strength with a strong yellowish tinge and also having a high transmittance. Since the above-mentioned green pigment capable of expressing the region C can emit a green color with a strong yellowish tinge in a chromaticity coordinate region, which cannot be expressed by the conventional halogenated copper phthalocyanine pigment, the color reproduction range can be widened to the yellowish region compared with the case of using the conventional green pigment so that the amount of the yellow pigment can be reduced for toning. Furthermore, since the above-mentioned green pigment capable of expressing the above-mentioned region C has a higher color strength compared with the PG36, it can get closer to the green color defined by the specification with a smaller amount compared with the case of using the PG36.

Therefore, by using optionally a combination of the first green pigment selected from the group consisting of the green pigments capable of expressing the above-mentioned region A and the second green pigment selected from the group consisting of the green pigments capable of expressing the region C, it can get closer to color of the green pixel defined by each specification with a smaller pigment use amount. As a result, the film thickness can be made thinner in the case of forming a color filter pixel so that the make-up property in printing is improved so as to facilitate formation of the minute shape by the photolithography. Moreover, since a green pixel which has a strong green color developing property with a sufficiently strong yellowish tinge while a mixing amount of the yellow pigment is small and/or a thin green pixel having a high transparency and the excellent color purity can be formed, and furthermore, the color reproduction range can be widened by a thin film thickness compared with the case of using the conventional green pigments.

Moreover, since both the above-mentioned green pigment capable of expressing the region A and the above-mentioned green pigment capable of expressing the region C have a high transmittance, in the case of forming a green pixel by further combination use with a yellow pigment, the transmittance can be made higher by a thinner film thickness compared with the conventional ones also in the region with a high color strength in the color coordinate (high density region). Therefore, in the case a combination of the green pigment capable of expressing the region A and the green pigment capable of expressing the region C is used optionally for forming a color filter, a color filter having a wide color reproduction range and a high transmittance can be formed with a thinner film thickness. Since the light transmission property of the color filter is made higher compared with the case of forming the same from the conventional photosensitive color composition using the halogenated copper phthalocyanine pigment such as the PG7 and the PG36, a strong back light is not needed any longer so that the cost increase of the liquid crystal panel or the increase of the electric power consumption can be restrained.

According to the green pigment capable of expressing the above-mentioned region C to be used as the second green pigment, it is preferable that when a transmittance in a spectral transmittance spectrum is 5% at a wavelength (Tmin) having a minimum transmittance, the wavelength (Tmax) at which a transmittance is maximum among a spectrum of a spectral transmittance between 380 and 780 nm is in a range of 520 to 535 nm. Furthermore, it is preferable that the transmittance at the above-mentioned wavelength (Tmax) is 90% or more, in particular 93% or more. Moreover, according to the phthalocyanine green pigment used in the present invention, it is preferable that the transmittance of the above-mentioned spectral transmittance spectrum at 435 nm as the wavelength of the blue light source of the F10 light source is 40% or less, and in particular, 35% or less. Furthermore, it is preferable that the transmittance of the above-mentioned spectral transmittance spectrum at 490 nm as the sub wavelength of a three wavelength pipe of the F10 light source is 85% or less, and in particular, 80% or less. Furthermore, it is preferable that the transmittance of the above-mentioned spectral transmittance spectrum at 610 nm as the wavelength of the red light source of the F10 light source is 30% or less, in particular, 25% or less.

As the central metal for the phthalocyanine green pigment used as the first green pigment and the second green pigment, Zn, Mg, Al, Si, Ti, V, Mn, Fe, Co, Ni, Ge, Sn, or the like can be presented. According to the first green pigment and the second green pigment, although the central metals of the phthalocyanine green pigments may be different, it is preferable that the central metals are same for the good compatibility, that is, the same dispersing agent system can be used so that the dispersion stability is in a good condition at the time of mixing the same for providing the good color development, thereby being preferably used in the present invention.

In particular, in the case the central metals of the phthalocyanine green pigments in both the first green pigment and the second green pigment are a Zn (zinc), the color strength and the transmittance are high, and thus it is preferable. The zinc is extremely suitable for expressing a green color of the sRGB specification for the multi media monitor or the peripheral lightness region thereof, and the NTSC, EBU specifications for the television. In particular, since a green pigment made of a brominated zinc phthalocyanine can express the above-mentioned region A and the above-mentioned region C, it can be used preferably as the above-mentioned first green pigment and second green pigment.

In the case of using a green pigment capable of expressing the above-mentioned region A as the first green pigment and a green pigment capable of expressing the above-mentioned region C as the second green pigment, a brominated zinc phthalocyanine having in average 8 or more and less than 13 bromine atoms in one molecule is preferable as the first green pigment, because it is extremely suitable for forming a green pixel for a color filter in view that it develops a green color which has a good color strength as a green color while being not excessively strong in bluish tinge and also has a high transmittance. In particular, a brominated zinc phthalocyanine having in average 10 to 11 bromine atoms in one molecule is preferable. As the second green pigment, a brominated zinc phthalocyanine having in average 13 or more bromine atoms in one molecule is preferable, because it is extremely suitable for forming a green pixel for a color filter in view that it develops a green color which has a high color strength with strong a yellowish tinge and also has a high transmittance. In particular, a brominated zinc phthalocyanine having in average 13 to 16 bromine atoms in one molecule without including a chlorine or having the same in average 3 or less in one molecule is preferable. Further, a brominated zinc phthalocyanine having in average 14 to 16 bromine atoms in one molecule without including a chlorine or having the same in average 2 or less in one molecule is more preferable.

Moreover, in the case the above-mentioned first green pigment and second green pigment have the average particle size of the primary particles in a range of 0.01 to 0.1 µm, the pigment agglomeration is relatively weak so that the pigment can be dispersed into a pigment dispersion or a color composition relatively easily so that a color filter having both high clearness and transmittance can be obtained easily. Moreover, the light blocking property at 365 nm, which is used frequently at the time of curing the color composition is lowered so that the photo curing sensitivity of the resist cannot be lowered and the film thickness reduction or the pattern running can hardly be generated at the time of the development, and thus it is preferable.

In the case the first green pigment and the second green pigment have a 1 to 3 as vertical and lateral aspect ratio of the primary particles, the viscosity characteristics can be improved in various application fields so that the flowability is made higher, and thus it is preferable. The brominated zinc phthalocyanine pigment used as the second green pigment can also be produced by the above-mentioned production method.

Among the above-mentioned combinations, it is particularly preferable that the first green pigment is one kind selected from the group consisting of the green pigments for a color filter capable of expressing the above-mentioned region B, and the second green pigment is one kind selected from the group consisting of the green pigments for a color filter capable of expressing the above-mentioned region C in terms of getting closer to a color of the green pixel of each specification with a relatively small use amount of the pigment, making higher the transmittance, making thinner the film thickness and widening the color reproduction range.

Moreover, in the case a phthalocyanine green pigment capable of expressing the above-mentioned region C is used as the second green pigment, it is preferable that the amount of the first green pigment is made larger than the amount of the second green pigment for expressing a green pixel having a strong bluish tinge and a wide color reproduction range of the NTSC, EBU specifications, while it is preferable that the amount of the second green pigment is made larger than the amount of the first green pigment for expressing a green pixel having a strong yellowish tinge and a high transmittance.

As to the green pigment in the coloring component of the present invention, although the above-mentioned effects can be obtained sufficiently if the green pigment is composed only of the above-mentioned first and second green pigments, the coloring component may further contain a plurality of pigments as the green pigment, such as a third green pigment and a fourth green pigment. Also in this case, it is preferable that the third or more green pigments are away from the first green pigment and the second green pigment on the xy-chromaticity coordinate region in terms of improving the effect of widening the color reproduction range. Specifically, "x" of each pigments is away by 0.02 or more, preferably 0.03 to 0.05 from each other when "y" is fixed at y=0.50. The third or more green pigments may either be selected from the above-mentioned regions A to C, or they may be selected from another region.

In the case the second green pigment is selected from the group consisting of the green pigments capable of expressing the above-mentioned region C, a photosensitive color composition capable of sufficiently achieving the effects of the present invention can be obtained even in the case the green pigment of the present invention, as the first green pigment, is not contained by 30% by weight or more based on the total amount of the coloring component in the photosensitive color composition, or the green pigment of the present invention is not contained by 50% by weight or more based on the total amount of the green pigment in the coloring composition in the photosensitive color composition. In this case, it is preferable that the total composition amount of the green pigment for a color filter capable of expressing the region A and the region C, which includes the first and second green pigments, and occasionally further includes the third or more green pigments, is by 30% by weight or more based on the total amount of the coloring component in the photosensitive color composition according to the present invention, furthermore, 39% by weight or more, in particular 50% by weight or more depending on the targeted color coordinates, in terms of forming a green pixel for a color filter having a wide color reproduction range and a high transmittance.

Moreover, it is preferable that the total composition amount of the green pigment for a color filter capable of expressing the region A and the region C, including the first and second green pigments, and occasionally the third or more green pigments is 50% by weight or more based on the total amount of the green pigment in the coloring component in the photosensitive color composition, and furthermore, 60% by weight or more in terms of forming a green pixel for a color filter having a wide color reproduction range and a high transmittance. Furthermore, depending on the targeted color coordinates, no amount of or an extremely small addition amount of the green pigment not belonging to the region A and the region C may be allowed, and in such a case, the targeted color coordinates can be adjusted even if a total composition amount of the green pigments for a color filter capable of expressing the region A and the region C, including the first and second green pigments, and occasionally the third or more green pigments is 80% by weight or more based on the total amount of the green pigment, and furthermore, 100% by weight.

Moreover, the transmittance of the spectral transmittance spectrum at a 380 to 470 nm wavelength can be lowered by combining a yellow pigment with the green pigment of the present invention. As the yellow pigment, for example, C. I. pigment yellow (PY) 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 126, 127, 128, 129, 138, 139, 150, 151, 152, 153, 154, 155, 156, 161, 162, 164, 166, 167, 168, 169, 170, 171, 172, 173, 174, 175, 176, 177, 179, 180, 181, 182, 185, 187, 199, or the like can be presented. For the high transmittance, or the suitability for having a thin film with only a small amount of the pigment, PY83, 138, 139, 150, 185 are preferable, and in particular, PY138, 150, 185 are preferable. These can be used by one kind or by a combination of two or more kinds.

Since the green pigment of the present invention has a low transmittance of the spectral transmittance spectrum at the 380 to 470 nm wavelength compared with the conventional green pigments and it is relatively strong in yellowish tinge while sufficiently coloring as a green color, an use amount of the yellow pigment can be reduced at the time of forming a green pixel for a color filter.

In the case of preparing a pigment dispersion or a photosensitive color composition by mixing the green pigment and the yellow pigment, even in the case of having the composition ratio of the yellow pigment with respect to the total amount of the green pigments including the green pigment of the present invention, and occasionally the second and more green pigments by the weight ratio (yellow pigment/green pigment) preferably 1.6 or less, and further preferably 0.8 or less, the transmittance of the spectral transmittance spectrum at the 380 to 470 nm wavelength can be lowered sufficiently. Furthermore, in the case of using the green pigment of the present invention, and furthermore, in the case of using the green pigment capable of expressing the above-mentioned region C for combination use as the second green, since they have a low transmittance of the spectral transmittance spectrum at the 380 to 470 nm wavelength, the above-mentioned transmittance can be lowered sufficiently even as a combination with a yellow pigment having a high transparency. In the case a yellow pigment having a high transparency is used in a combination, the transmittance of the pigment after toning can be made higher.

Since the green pigment according to the present invention has the excellent color strength and a high transmittance so that the sufficient color development can be obtained with a small amount thereof, by toning mainly therewith, the use amount of the yellow pigment to be used in a combination can be made smaller as well as mentioned above so that the use amount of the pigment on the whole can be cut back so that a green pixel having a high transparency and the excellent color purity can be formed. Moreover, since the yellow pigments have the poor heat resistance or light resistance in many cases, by reducing the use amount of the yellow pigment, the endurance of the green pixel can be improved as well.

Moreover, in the case the green pigment capable of expressing the above-mentioned region C is further used as the second green pigment, since the green pigment capable of expressing the above-mentioned region C has the excellent color strength, a high transmittance and a strong yellowish tinge, by using the same in a combination, a green color having a strong yellowish tinge can be developed sufficiently even with a small amount of the pigment use amount. By toning with the green pigment of the present invention and the green pigment capable of expressing the above-mentioned region C mainly as the coloring component, the use amount of the yellow pigment to be used in a combination can be reduced as mentioned above so that the use amount of the pigment on the whole can further be reduced, and thus a photosensitive color composition capable of forming a green pixel having a high transparency and the excellent color purity can be obtained.

In the case a high density type (high color density type) color filter is required for obtaining an image display apparatus having a large color reproduction range, a photosensitive color composition having an extremely large pigment ratio (high concentration type photosensitive color composition) is used frequently. However, since the high concentration type photosensitive color composition has a large composition ratio of the pigment, the influence on the optical performance other than the color density such as the transparency, the minute pattern forming ability, the film property, or the like is extremely significant at the time of forming a pixel. To the contrary, in the case of using the green pigment of the present invention, the color development sufficiently compatible to the high concentration type can be obtained even with an extremely small amount of the pigment for the high concentration type photosensitive color composition. For example, even with the pigment (P)/vehicle (V) ratio (weight ratio) in a range of 0.25 to 1.0, preferably 0.25 to 0.8, a green pixel having a high density and a high transparency can be formed. The pigment (P) in the P/V ratio in the present invention is the total amount of the above-mentioned coloring component contained in the photosensitive color composition according to the present invention, that is, it means a total amount of the pigments, including the other pigments mixed in the green pigment such as the yellow pigment. Moreover, the vehicle denotes an nonvolatile component excluding the pigment in the photosensitive color composition so that a liquid monomer component is included in the vehicle.

Moreover, since the use amount of a dispersing agent for dispersing agent can be reduced as well according to the reduction of the pigment use amount, in the case a pixel is formed using a photosensitive color composition which is comprised of a component not related to the curing reaction (non reactive component) such as the pigment and the dispersing agent and a component related to the curing reaction (reactive component) such as a photo curing resin, an initiating agent and a thermosetting resin, the composition ratio of the non reactive component is cut back and the composition ratio of the reactive component is increased. Specifically, the photosensitive color composition according to the present invention can reduce the weight ratio (b/a) of the above-mentioned non reactive component (b) other than the coloring component with respect to the above-mentioned reactive component (a) to 0.45 or less, and thus a sufficient reactivity can be obtained. Here, the non reactive component other than the coloring component is provided mainly with a dispersing agent. Therefore, as long as a sufficient pigment dispersing property is obtained, an use amount of the dispersing agent can be made smaller according as getting the above-mentioned weight ratio (b/a) smaller, so that the ratio of the reactive component in the photosensitive color composition can be increased. As a result, the photo curing property can be enhanced so that a green pixel having the excellent physical properties such as the film hardness after curing, the film elasticity after curing, the film thickness evenness, restraint of the pixel pattern lacking at the time of development, the residue reduction, the developing property improvement, an improvement of the film in a cross linking density after curing, and a reduction of the film thickness can be obtained.

As a dispersing agent for preparing the pigment dispersion, the polymer dispersing agents shown as follows, that is, the (meth) acrylic acid based (co)polymer Poly Flow No. 75, No. 90, No. 95 (produced by KYOEISHA CHEMICAL Co., LTD.), MEGAFACE F171, F172, F173 (produced by DAINIPPON INK AND CHEMICALS, Incorporated), Fluorad Fc430, Fc431 (produced by Sumitomo 3M Limited), various solspace dispersing agents such as Solsperse 13240, 20000, 24000, 26000 and 28000 (produced by Avecia Limited), Disperbyk 111, 161, 162, 163, 164, 182, 2000, 2001 (produced by BYK Chemie), Ajisper PB711, PB411, PB111, PB821, PB822 (Ajinomoto Fine-Techno Co., Inc.), or the like can be used.

Cationic based, anionic based, nonionic based, amphoteric, silicone based, fluorine based, or the like surfactants can be used as a dispersing agent as well. Among the surfactants, the polymer surfactants presented below, that is, polymer surfactants such as polyoxy ethylene alkyl ethers such as including a polyoxy ethylene lauryl ether, a polyoxy ethylene stearyl ether, and a polyoxy ethylene oleyl ether; polyoxy ethylene alkyl phenyl ethers such as a polyoxy ethylene octyl phenyl ether, and a polyoxy ethylene nonyl phenyl ether; polyethylene glycol diesters such as a polyethylene glycol dilaurate, and a polyethylene glycol distearate; sorbitan fatty acid esters; fatty acid modified polyesters; tertiary amine modified polyurethanes, or the like can be used preferably.

As to the composition ratio of the dispersing agent, in general, it is used by a ratio of 100 parts by weight or less with respect to 100 parts by weight of the pigment (total of the green pigment and the other pigments), and preferably by 30 parts by weight or less.

As the solvent (dispersing solvent) for preparing a pigment dispersion, various kinds of organic solvents used as a diluting solvent for preparing a photosensitive color composition to be described later can be used. The dispersing solvent is used in general by a ratio of 100 to 1,000 parts by weight with respect to 100 parts by weight of the pigment (total of the green pigment and the other pigments), and preferably by 200 to 900 parts by weight.

The pigment dispersion can be prepared by mixing a green pigment, other pigments, a dispersing agent, and as needed, other components in a solvent by an optional order, and dispersing the same using a known dispersing machine such as a jet mill, a kneader, a roll mill, an attriter, a super mill, a dissolver, a homo mixer, and a sand mill. The green pigment of the present invention may either be prepared as a dispersion independently from the other pigments, or it may be prepared as a dispersion by mixing the same with the other pigments.

The photosensitive color composition can be prepared by including the component related to photo curing, such as the photo polymerizable compound and the photo polymerization initiating agent, that is, the photosensitive component together with the green pigment, the other pigments and the dispersing agent, and as needed diluting the same appropriately with a solvent.

The photo polymerizable compound is a compound to be cured by itself directly through the polymerization reaction by the light irradiation, or cured by generating the polymerization reaction by the function of an initiating agent activated by the light irradiation. The reaction method of the photo polymerizable compound may be either of the radical polymerization, the anion polymerization, the cation polymerization, or the like. As the photo polymerizable compound, in general, a radically polymerizable monomer, oligomer, polymer having an ethylenically unsaturated bond is used.

As the monomer or oligomer having an ethylenically unsaturated bond, a polyfunctional acrylate based monomer or oligomer can be used preferably. For example, an ethylene glycol (meth)acrylate, a diethylene glycol di(meth)acrylate, a propylene glycol di(meth)acrylate, a dipropylene glycol di(meth)acrylate, a polyethylene glycol di(meth)acrylate, a polypropylene glycol di(meth)acrylate, a hexane di(meth) acrylate, a neopentyl glycol di(meth)acrylate, a glycerol di(meth)acrylate, a glycerol tri(meth)acrylate, a glycerol tetra (meth)acrylate, a tetratrimethylol propane tri(meth)acrylate, a 1,4-butane diol diacrylate, a pentaerythritol triacrylate, a trimethylol propane triacrylate, a pentaerythritol (meth)acrylate, a dipentaerythritol hexa(meth)acrylate, or the like can be presented. These components may be used as a combination of two or more kinds.

It is preferable that at least apart of the above-mentioned monomer or oligomer has two or more radically polymerizable groups for obtaining a sufficient cross linking density, and particularly preferably three or more of them.

As a polymer having the ethylenically unsaturated bond, a polymer of the above-mentioned polyvaleic acrylate based monomers, and a polymer produced by polymerizing a monomer having another functional group such as a hydroxyl group and a carboxylic group together with an ethylenically unsaturated bond, and introducing the ethylenically unsaturated bond to the other functional groups such as the hydroxyl group and the carboxylic group present in the polymer molecule can be used.

Since it is preferabe to use a polymerizable polymer in order to obtain a sufficient film producing property, and it is preferable to use a polymerizable monomer or oligomer in order to obtain a sufficient cross linking density, it is preferable to use a mixture thereof.

A binder resin comprising a polymerizable or non polymerizable polymer and/or a polymerizable monomer and/or an oligomer is contained in the photosensitive color composition at in general 5 to 15% by weight by a solid component ratio, and preferably by 7 to 10% by weight.

As the photo polymerization initiating agent, a compound capable of generating an active species for starting the polymerization reaction such as the radical polymerization, the anion polymerization and the cation polymerization by the light irradiation can be used, and one capable of generating an appropriate active specie is selected according to the reaction method of the above-mentioned photo polymerizable compound. As the photo radical initiating agent, a compound capable of generating a free radical by an ultraviolet ray, an ionizing radiation, a visible light beam, or an energy line of another wavelength, in particular, of 365 nm or less can be used. Examples thereof include benzophenone derivatives such as a benzoin and a benzophenone or derivatives thereof such as an ester; xanthone and thioxanthone derivatives; halogen including compounds such as a chlorosulfonyl, a chloromethyl multinuclear aromatic compound, a chloromethyl heterocyclic compound and chloromethyl benzophenones; triazines; fluorenones; haloalkanes; redox couples of a photo reducing pigment and a reducing agent; an organic sulfur compound; a peroxide, or the like. Preferably, ketone based and biimidazol based compounds such as IRGACURE 184, IRGACURE 369, IRGACURE 651, IRGACURE 907 (produced by Chiba Specialty Chemicals), DAROCURE (produced by Merck Ltd.), ADEKA 1717 (produced by Asahi Denka Co., Ltd.), and 2,2'-bis(o-chlorophenyl)-4,5,4',5'-tetraphenyl-1,2'-biimida zol (produced by Kurogane Kasei Co., Ltd.) can be presented. These initiating agents can be used only by one kind or as a combination of two or more kinds. In the case they are used as a combination of two or more kinds, it is preferable that the absorption spectral characteristics are not hindered.

The photo radical initiating agent is contained in the photosensitive color composition at in general 0.05 to 18% by weight by the solid component ratio, and preferably 0.1 to 13% by weight. In the case the addition amount of the photo radical initiating agent is less than 0.05% by weight, the photo curing reaction cannot proceed so that the residual film ratio, the heat resistance, the chemical resistance, or the like tend to be lowered. Moreover, in the case the addition amount of more than 18% by weight, the solubility to the base resin reaches the saturation so that the crystals of the initiating agent are precipitated at the time of spin coating or coating layer leveling so as not to maintain the homogeneity of the film surface, and thus a problem of the film roughing can be generated.

At the time of preparing the photosensitive color composition, although the photo polymerization initiating agent may be added to the photosensitive color composition of the present invention initially, in the case of storing for a relatively long term period, it is preferable to disperse or dissolve the same in the photosensitive color composition immediately before the use.

Furthermore, to the photosensitive color composition of the present invention, for the purpose of improving the heat resistance, the cohesion property and the chemical resistance (in particular, the alkaline resistance), as needed, a compound having two or more epoxy groups in a molecule (epoxy resin) may be included. As the compound having two or more epoxy groups in a molecule, for example, EPIKOTE 1001, 1002, 1003, 1004, 1007, 1009, 1010 (produced by Yuka Shell Epoxy Co., Ltd.), or the like as the bisphenol A type epoxy resins, EPIKOTE 807 (produced by Yuka Shell Epoxy Co., Ltd.), or the like as the bisphenol F type epoxy resins, EPPN201, 202 (produced by NIPPON KAYAKU CO., LTD.), and EPIKOTE 154 (produced by Yuka Shell Epoxy Co., Ltd.), or the like as the phenol novolak type epoxy resins, EOCN102, 103S, 104S, 1020, 1025, 1027 (produced by NIPPON KAYAKU CO., LTD.), EPIKOTE 180S (produced by Yuka Shell Epoxy Co., Ltd.), or the like as the cresol novolak type epoxy resins, can be presented. Furthermore, a cyclic aliphatic epoxy resin and an aliphatic polyglycidyl ether can be presented as the examples as well.

Such an epoxy resin is contained in the photosensitive color composition at in general 0 to 60% by weight by the solid component ratio, preferably 5 to 40% by weight.

To the above-mentioned photosensitive color composition, as needed, in addition to the above-mentioned components, various kinds of additives such as a silane coupling agent can be included.

To the above-mentioned photosensitive color composition, in consideration to the paint formation and the coating suitability, in general, a solvent having a relatively high boiling point is contained for providing a good solubility to the composition component such as a photo polymerizable compound, a polyvaleic radical polymerizable compound, and a photo polymerization initiating agent, and for providing a good spin coating property. As a solvent to be used, for example, alcohol based solvents such as a methyl alcohol, an ethyl alcohol, a N-propyl alcohol, and a i-propyl alcohol;

cellosolve based solvents such as a methoxy alcohol and an ethoxy alcohol; carbitol based solvents such as a methoxy ethoxy ethanol and an ethoxy ethoxy ethanol; ester based solvents such as an ethyl acetate, a butyl acetate, a methoxy methyl propionate, an ethoxy ethyl propionate and an ethyl lactate; ketone based solvents such as an acetone, a methyl isobutyl ketone, and a cyclohexanone; cellosolve acetate based solvents such as a methoxy ethyl acetate, an ethoxy-ethyl acetate, and an ethyl cellosolve acetate; carbitol acetate based solvents such as a methoxy ethoxy ethyl acetate, and an ethoxy ethoxy ethyl acetate; ether based solvents such as a diethylether, an ethylene glycoldimethylether, a diethylene glycol dimethyl ether and a tetrahydrofuran; non protonic amide solvents such as a N,N-dimethyl formamide, a N,N-dimethyl acetamide, and a N-methyl pyrolidone; lactone based solvents such as a γ-butylolactone; unsaturated hydrocarbon based solvents such as a benzene, a toluene, a xylene, and a naphthalene; saturated hydrocarbon based solvents such as a N-heptane, a N-hexane and a N-octane, or the like can be presented. Among these solvents, cellosolve acetate based solvents such as a methoxy ethyl acetate, an ethoxy ethyl acetate, and an ethyl cellosolve acetate; carbitol acetate based solvents such as a methoxy ethoxy ethyl acetate, and an ethoxy ethoxy ethyl acetate; ether based solvents such as a ethylene glycol dimethyl ether, a diethylene glycol dimethyl ether and a propylene glycol diethyl ether; non protonic amide solvents such as a N,N-dimethyl acetamide; and ester based solvents such as a methoxy methyl propionate, an ethoxy ethyl propionate and an ethyl lactate can be used particularly preferable. Particularly preferably, a N,N-dimethyl acetamide, a MBA (acetic acid-3-methoxy butyl, $CH_3CH(OCH_3)CH_2CH_2OCOCH_3$), PGMEA (propylene glycol monomethyl ether acetate, $CH_3OCH_2CH(CH_3)OCOCH_3$), DMDG (diethylene glycol dimethyl ether, $H_3COC_2H_4OCH_3$), or a mixture thereof can be used such that the solid component concentration is adjusted to 10 to 70% by weight while using them.

The photosensitive color composition can be produced by introducing the green pigment of the present invention, other pigments, a dispersing agent, a photo polymerizable compound, a photo polymerization initiating agent, and other components into an appropriate solvent, or by introducing a pigment dispersion made of the green pigment of the present invention, other pigments, a dispersing agent, or the like, and a photosensitive component such as a photo polymerizable compound and a photo polymerization initiating agent, and other components into a solvent, and dissolving or dispersing the same by a common method such as a paint shaker, a bead mill, a sand grind mill, an attriter mill, a two-roll mill, a three-roll mill and a kneader.

A green pixel for a color filter can be formed using the photosensitive color composition accordingly obtained. The color filter comprises a black matrix formed in a predetermined pattern on a transparent substrate and a pixel part formed in a predetermined pattern over the black matrix, and further as needed, a protection layer formed so as to cover the pixel part. A transparent electrode for driving a liquid crystal may be formed as needed on the protection layer. Moreover, a spacer can be formed on the transparent electrode plate or the pixel part or the protection layer according to the region with the black matrix layer formed.

The pixel part has the red pixels, the green pixels and the blue pixels arranged in a desired pattern such as a mosaic type, a stripe type, a triangle type, and a four pixel arrangement type, and the black matrix layer is provided between the pixel patterns and a predetermined region outside the pixel part forming region.

The green pixels can be formed by applying a photosensitive color composition containing a green pigment of the present invention on one surface side of the transparent substrate, exposing the same by the light irradiation via a photo mask, executing the alkaline development, and heating and curing by a clean oven, or the like. As to the colored layer such as the other color pixels and the black matrix layer, it is preferable to form the same by the pigment dispersion method as in the case of the green pixels, however, it can be formed by other methods such as a dyeing method, a printing method, and an electrodeposition method. The black matrix layer may be formed by a chromium deposition, or the like. The pixel part is formed in general at about a 2.0 µm thickness.

The protection layer can be formed by applying a coating solution of a transparent photosensitive resin composition by a method of a spin coater, a roll coater, spraying, printing, or the like. The protection layer is formed at about 2µm thickness. In the case a spin coater is used, the rotational frequency is set in a range of 500 to 1,500 rotations/minute. The coating layer of the photosensitive resin composition is exposed to the light irradiation via a photo mask, subjected to the alkaline development, and thereafter heated and cured by a clean oven, or the like so as to provide a protection layer.

The transparent electrode on the protection layer is formed by a common method such as a sputtering method, a vacuum deposition method and a CVD method, using an indium tin oxide (ITO), a zinc oxide (ZnO), a tin oxide (SnO), or the like, and an alloy thereof, or the like. As needed, it is formed into a predetermined pattern by etching using a photo resist or by use of a jig. The thickness of the transparent electrode is about 20 to 500 nm, and it is preferably about 100 to 300 nm.

A spacer on the transparent electrode can be formed by applying a coating solution of a photosensitive resin composition by a method of a spin coater, a roll coater, spraying, printing, or the like, exposing the same to the light irradiation via a photo mask, executing the alkaline development, and thereafter heating and curing by a clean oven, or the like. It is preferable that the above-mentioned spacer is a columnar spacer having a height corresponding to the cell gap. For example, the columnar spacer is formed at about a 5 µm height. As in the case of forming a protection layer, the rotational frequency of the spin coater can be set in a range of 500 to 1,500 rotations/minute.

The orientation layer can be formed by applying a coating solution containing a resin such as a polyimide resin onto the inner surface side of a color filter by a known method such as spin coating, drying, as needed, curing by heat or a light beam, and then rubbing.

The color filter accordingly obtained is comprised of a transparent substrate and a pixel part formed on the transparent substrate, and furthermore, as needed, it may be further comprised of a black matrix layer, a protection layer for covering the above-mentioned colored layer and/or a spacer provided for maintaining the interval with respect to an electrode substrate facing therewith at a position to be superimposed on a non display part, or the like. Among the pixel part, the green pixels contain the green pigment of the present invention.

When the green pixel has a thickness of 2.7 µm or less, preferably 2.5 µm or less and is solely subjected to colorimetry using a F10 light source, it is capable of expressing a color space ranging $0.21 \leq x \leq 0.30$ in a x coordinate, $0.55 \leq y \leq 0.71$ in a y coordinate and $29 \leq Y$ in a stimulus value "Y" defined by the XYZ color system of the CIE so that a wide color reproduction range can be ensured by combining with another color pixel as well as an extremely large transmittance can be provided even with a thin film thickness.

Moreover, the above-mentioned green pixel can make stronger the yellowish tinge by mixing only a small amount of the yellow pigment, and thus even in the case the weight ratio of the above-mentioned yellow pigment to the above-mentioned green pigment in the pixel (yellow pigment/green pigment) is 1.6 or less, it is capable of expressing a region of xy-chromaticity coordinate ranging $0.21 \leq x \leq 0.30$ in a x coordinate and $0.55 \leq y \leq 0.71$ in a y coordinate defined by the XYZ system of the CIE when the green pixel is solely subjected to colorimetry using a F10 light source.

Furthermore, in the case the above-mentioned green pixel contains at least one kind selected from the group consisting of the green pigments capable of expressing the above-mentioned region A as a first green pigment and a green pigment capable of expressing the above-mentioned region C as a second green pigment, and when the pixel has a film thickness of 2.5 μm or less and is solely subjected to colorimetry using a F10 light source, it is capable of expressing a color space ranging $0.25 \leq x \leq 0.32$ in a x coordinate, $0.55 \leq y \leq 0.75$ in a y coordinate and $30 \leq Y$ in a stimulus value "Y", more preferably, $40 \leq Y$, and further preferably $50 \leq Y$ defined by the XYZ color system of the CIE so that a wide color reproduction range can be ensured by combining with another color pixel as well as an extremely large transmittance can be provided even with a thin film thickness.

Moreover, also in the case the above-mentioned green pixel contains at least one kind selected from the group consisting of the green pigments capable of expressing the above-mentioned region A as a first green pigment and a green pigment capable of expressing the above-mentioned region C as a second green pigment, the above-mentioned green pixel can make stronger the yellowish tinge by mixing only a small amount of the yellow pigment, and thus even in the case the weight ratio of the above-mentioned yellow pigment to the total amount of the above-mentioned green pigment in the pixel (yellow pigment/green pigment) is 1.6 or less, it is capable of expressing a region of xy-chromaticity coordinate ranging $0.25 \leq x \leq 0.32$ in a x coordinate and $0.55 \leq y \leq 0.75$ in a y coordinate defined by the XYZ system of the CIE when the green pixel is solely subjected to colorimetry using a F10 light source.

Moreover, according to the above-mentioned green pixel, since the non reactive component such as a pigment and a dispersing agent can be reduced so that the composition ratio of the photosensitive component such as a photo polymerizable compound and a photo polymerization initiating agent, the curing component other than the photosensitive component such as a thermosetting resin, and the developing component such as an alkaline soluble binder can be increased, the photo setting property, the minute pattern forming ability, and the physical properties after the pixel formation are good. Specifically, the irradiation sensitivity is good, the residue can hardly be generated, the foreign substances do not remain, the developing degree is high, the shape after the development is accurate, the pixel cross section is trapezoidal, and the film thickness is even. Moreover, since the obtained pixel has a high cross linking density, the excellent hardness and elasticity can be provided and the impurity elution is little.

According to the present invention, since the coating layer is cured sufficiently to the lower side at the time of exposing the coating layer of the photosensitive color composition from the upper surface, it does not have an inverse tapered shape at the time of the development so that it can be formed in a tapered shape with a less than 1 ratio of the upper edge length with respect to the bottom edge length (upper edge/bottom edge) in a cross section of the pixel, and thus the pattern shape is preferable.

Moreover, the obtained green pixel has a 500 N/mm$^2$ or more hardness or a 20% or more elastic deformation, and thus a green pixel to be hardly deformed can be obtained.

The pixel hardness is specified as the universal hardness (test load/specific surface area of the Vickers indenter under the test load: N/mm$^2$) at the time of measuring the surface hardness under the conditions with the maximum load of the Vickers indenter of 20 mN (load applying speed 2 mN/second, maintained at the maximum load for 5 seconds, load eliminating speed 2 mN/second), using a super minute hardness meter (WIN-HCU produced by Fischer Instruments, K.K).

Moreover, the elastic deformation modulus in the above-mentioned test is specified by measuring the elastic deformation amount and the plastic deformation amount so as to have the ratio of the elastic deformation amount with respect to the total deformation amount as the total sum of the elastic deformation amount and the plastic deformation amount.

Moreover, for a liquid crystal color television, a high speed response is required so as to correspond to the video images. Since a sufficient amount of the curing component can be used by using the green pigment of the present invention with respect to the demand, the impurity elution property can be reduced so that a color filter having the excellent voltage sustaining ratio, or the like can be produced so as to be employed for the liquid crystal color television.

By facing the color filter produced accordingly with a liquid crystal driving side substrate as a counterpart member, filling the gap part with a liquid crystal and sealing, a liquid crystal panel can be obtained. Such a liquid crystal panel can be used preferably as a display apparatus such as a flat display for a personal computer, or the like.

Although a color filter for a liquid crystal display apparatus has been explained as the representative example of a color filter according to the present invention, the present invention can be adopted to an active system color filter regardless of the driving mode such as the TN, the IPS and the VA. Moreover, it can be adopted to a color filter of not only the active system but also various kinds of the driving systems, such as a simple matrix system. Furthermore, it can be adopted also to a color filter for a display apparatus of a system other than the liquid crystal display apparatus, such as a color filter of an EL (electroluminescence) device.

The EL device can execute the full color display by arranging EL elements of the RGB colors in a matrix and controlling the light emission of each color. By disposing the color filter on the light taking out side of the EL element (viewer side), the display performance can be improved by modulating the color developing light beam. Moreover, the effect of protecting the EL element from the external light beam by the color filter so as to contribute to the long life, or the like can also be obtained.

EXAMPLES

A. Synthesis of the Green Pigment

Synthesis Example 1

A zinc phthalocyanine was produced with a phthalodinitrile and a zinc chloride used as the materials. A 1-chloronaphthalene solution thereof absorbed the light beam at 600 to 700 nm. For the halogenation, 3.1 parts by weight of a sulfryl chloride, 3.7 parts by weight of an aluminum chloride anhydrate, 0.46 part by weight of a sodium chloride and 1 part by weight of a zinc phthalocyanine were mixed at 40° C., and 2.2 parts by weight of a bromine was dropped. Reaction was carried out at 80° C. for 15 hours, and thereafter the reaction mixture was introduced into water so as to precipitate a brominated zinc phthalocyanine crude pigment. By filtrating the water based slurry, washing with hot water of 80° C., and drying at 90° C., 2.6 parts by weight of a refined brominated zinc phthalocyanine crude pigment was obtained.

1 part by weight of the brominated zinc phthalocyanine crude pigment, 7 parts by weight of a pulverized sodium chloride, 1.6 parts by weight of a diethylene glycol, and 0.09 part by weight of a xylene were placed in a two arm type kneader so as to be kneaded at 100° C. for 6hours. After the kneading operation, it was taken out into 100 parts by weight of water of 80° C. After agitating for 1 hour, filtration, washing with hot water, drying and pulverization were carried out to obtain a brominated zinc phthalocyanine pigment (hereinafter it is referred to as the pigment composition (1)).

According to the halogen content analysis by the mass analysis, the obtained brominated zinc phthalocyanine pigment has the average composition $ZnPcBr_{10}Cl_4H_2$ (Pc: phthalocyanine) with average 10 bromines contained in one molecule.

The average value of the primary particle size measured by a transmission type electron microscope (JEM-2010 produced by JEOL Ltd.) was 0.065 μm.

Synthesis Example 2

A zinc phthalocyanine was produced with a phthalodinitrile and a zinc chloride used as the materials. A 1-chloronaphthalene solution thereof absorbed the light beam at 600 to 700 nm. For the halogenation, 3.1 parts by weight of a sulfryl chloride, 3.7 parts by weight of an aluminum chloride anhydrate, 0.46 part by weight of a sodium chloride and 1 part by weight of a zinc phthalocyanine were mixed at 40° C., and 2.63 parts by weight of a bromine was dropped. Reaction was carried out at 80° C. for 15 hours, and thereafter the reaction mixture was introduced into water so as to precipitate a brominated zinc phthalocyanine crude pigment. By filtrating the water based slurry, washing with hot water of 60° C., and drying at 90° C., 2.8 parts by weight of a refined brominated zinc phthalocyanine crude pigment was obtained.

To the brominated zinc phthalocyanine, the other components were added by the same composition as in the above-mentioned synthesis example 1 so that a pigment was produced by the same method using a kneader so as to obtain a brominated zinc phthalocyanine pigment (hereinafter it is referred to as the pigment composition (2)).

According to the halogen content analysis by the mass analysis, the obtained brominated zinc phthalocyanine pigment has the average composition $ZnPcBr_{12}Cl_3H$ (Pc: phthalocyanine) with average 12 bromines contained in one molecule.

The average value of the primary particle size measured by a transmission type electron microscope (JEM-2010 produced by JEOL Ltd.) was 0.065 μm.

B. Preparation of the Green Pigment Dispersion

Dispersion Example 1

Figure 5:
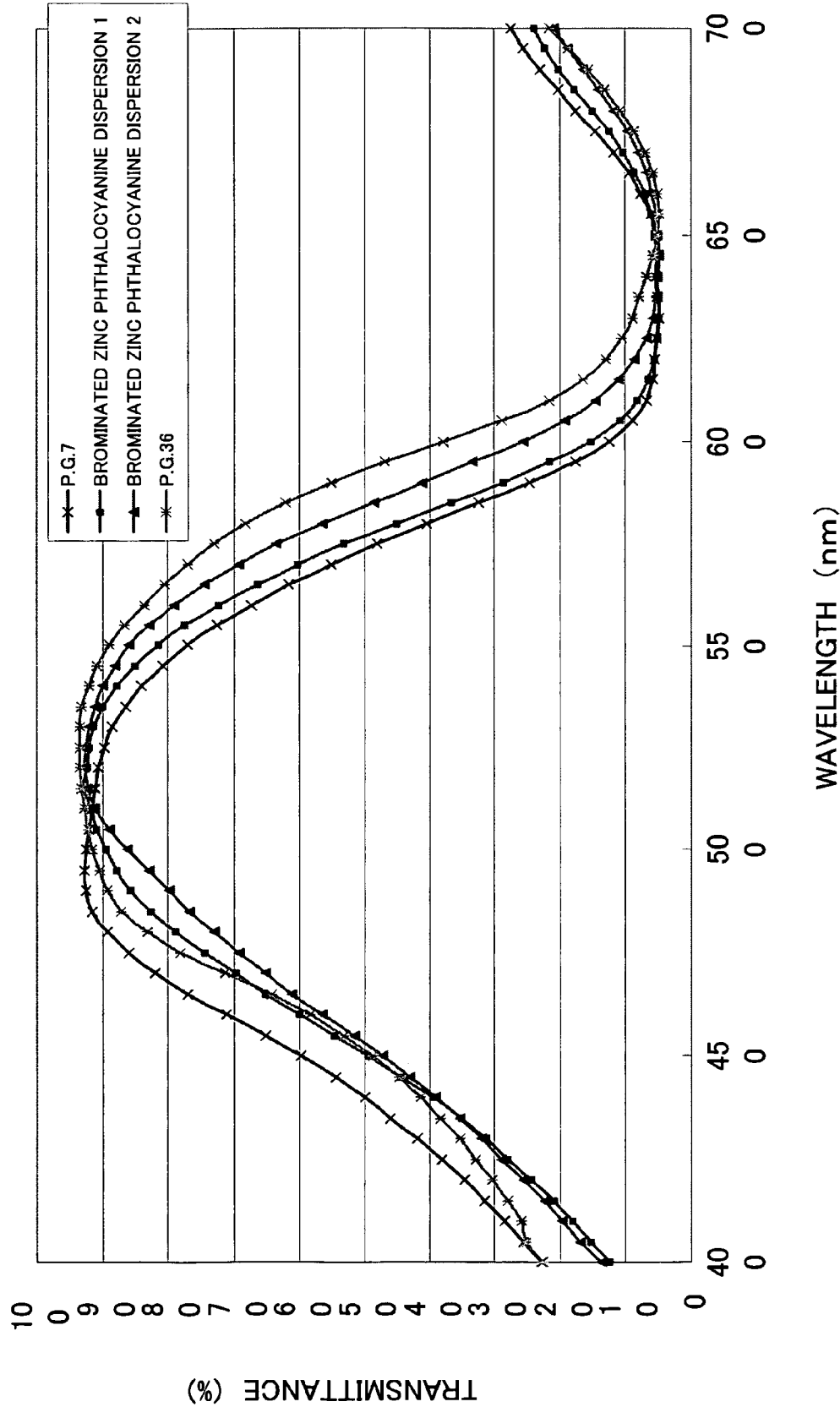
FIG. 5 is a graph showing the single color spectral transmittance spectra of the green pigment according to the present invention and the conventional green pigment.

15 parts by weight of the pigment composition (1) synthesized in the above-mentioned synthesis example 1, 7 parts by weight of an acrylic based dispersing agent "BYK-2001" produced by BYK Chemie, and 78 parts by weight of a propylene glycol monomethyl ether acetate (hereinafter it is referred to as the PGMEA) were placed in a high speed dispersing machine "TSC-6H" produced by Igarashi Kikai Seizou Corp. with zirconia beads having a 0.5 mm diameter placed so as to be agitated at 2,000 rotations per minute for 8 hours so as to prepare a brominated zinc phthalocyanine pigment dispersion (1). After the preparation, the spectral transmittance spectrum measurement, the particle size distribution measurement and the viscosity measurement were carried out. The evaluation results are shown in the Table 1. Moreover, the single color spectral transmittance spectrum in which a transmittance is 5% at a wavelength (Tmin) having a minimum transmittance is shown in FIG. 5 together with the single color spectral transmittance spectra of the PG7 and the PG36, which are the conventional green pigments.

a) Spectral Transmittance Spectrum Measurement

The single color spectral transmittance spectrum was measured using a micron spectrophotometer OSP-SP200 produced by Olympus Corporation. The measurement conditions were a F10 light source as the light source, 20 times of the illumination magnification and the pin hole No. 7 (50 μm).

b) Viscosity Measurement

The viscosity at 23.5° C. was measured using a rotation vibration type viscometer (Viscomate VM-1G produced by YAMAICHI ELECTRONICS CO., LTD.).

c) Particle Size Distribution Measurement 0.1 part by weight of the pigment dispersion was diluted by 9.9 parts by weight of a PGMEA solvent for the particle size distribution measurement by Microtrac UPA particle size distribution meter (produced by NIKKISO CO., LTD.).

Dispersion Example 2

In the same manner as in the dispersion example 1 except that the pigment composition (2) synthesized in the above-mentioned synthesis example 2 was used instead of the pigment composition (1), a brominated zinc phthalocyanine pigment dispersion (2) was prepared so as to be evaluated in the same manner as in the dispersion example 1. The evaluation results are shown in the Table 1. Moreover, the single color spectral transmittance spectrum in which a transmittance is 5% at a wavelength (Tmin) having a minimum transmittance is shown in FIG. 5 together with the single color spectral transmittance spectra of the PG7 and the PG36, which are the conventional green pigments.

Dispersion Comparative Example 1

In the same manner as in the dispersion example 1 except that the Pigment Green 7 (chlorinated copper phthalocyanine pigment) was used instead of the pigment composition (1), a chlorinated copper phthalocyanine pigment dispersion was prepared so as to be evaluated in the same manner as in the dispersion example 1. The evaluation results are shown in the Table 1.

Dispersion Comparative Example 2

In the same manner as in the dispersion example 1 except that the Pigment Green 36 (brominated copper phthalocyanine pigment) was used instead of the pigment composition (1), a brominated copper phthalocyanine pigment dispersion was prepared so as to be evaluated in the same manner as in the dispersion example 1. The evaluation results are shown in the Table 1.

TABLE 1

| | | Green pigment single color dispersion | | | |
|---|---|---|---|---|---|
| | | Dispersion example 1 (dispersion 1) | Dispersion example 2 (dispersion 2) | Dispersion comparative example 1 (PG7 dispersion) | Dispersion comparative example 2 (PG36 dispersion) |
| Tmax wavelength | | 515 nm | 520 nm | 495 nm | 520 nm |
| Spectral transmittance | Maximum | 93.8% | 92.8% | 92.7% | 93.6% |
| | Minimum | | | 5% | |
| Spectrum (Tmin 5%) | 435 nm | 38.7% | 35.2% | 46.0% | 38.2% |
| | 490 nm | 86.0% | 79.9% | 92.5% | 89.3% |
| | 545 nm | 85.6% | 88.0% | 80.9% | 90.8% |
| | 610 nm | 9.2% | 14.6% | 6.9% | 21.6% |
| Chromaticity (y = 0.440) | (x value) | 0.247 | 0.274 | 0.214 | 0.284 |
| | (y value) | | | 0.440 | |
| | (Y value) | 61.2 | 68.1 | 45.9 | 71.7 |
| Viscosity | | 4.7 cps | 4.6 cps | 5.8 cps | 5.2 cps |
| Particle size Distribution | 10% | 29.1 | 31.5 | 35.5 | 34.2 |
| | 50% | 53.6 | 52.8 | 65.0 | 63.8 |
| | 90% | 101.5 | 103.4 | 120.3 | 111.9 |

According to the dispersion examples 1, 2 according to the present invention, it was revealed that the transmittance of the above-mentioned spectral transmittance spectrum at 435 nm, which is the wavelength of the blue light source of the F10 light source, was lower than that of the PG7 so that the bluish tinge to be eliminated by toning was reduced. Furthermore, since the transmittance at 490 nm, which is the sub wavelength of the three wavelength pipe of the F10 light source, was lower than that of the PG7 and PG36 so that the sub wavelength light source of the F10 light source was not transmitted, it was revealed that the color strength as a green color can be made higher. Moreover, it was revealed that the transmittance at 545 nm was higher than that of the PG7 so as to provide a high transmittance in the vicinity of 545 nm, which is the green color wavelength. Moreover, the transmittance at 610 nm was. lower than that of the PG36, and thus it was revealed that the reddish tinge was small. Moreover, according to the dispersion examples 1, 2 of the present invention, it was revealed that the chromaticity coordinate region between the PG7 and the PG 36 can be displayed and the Y value is relatively high, that is, the lightness is high.

Moreover, according to the dispersion examples 1, 2 of the present invention, the viscosity was lower than that of the PG7 and the PG36 so that the dispersion property was good. Furthermore, according to the dispersion examples 1, 2 of the present invention, since the average particle size (50% particle size) was smaller than that of the PG7 and the PG36, it was revealed that it is processed finely so that the dispersion property is good.

C. Preparation of the Photosensitive Green Composition

Production Example 1

A green pigment for a color filter capable of expressing the above-mentioned region C, having a stronger yellowish tinge than the green pigment of the present invention, to be used for a photosensitive green composition was produced. First, a zinc phthalocyanine was produced with a phthalodinitrile and a zinc chloride used as the materials. A 1-chloronaphthalene solution thereof absorbed the light beam at 600 to 700 nm. For the halogenation, 3.1 parts by weight of a sulfryl chloride, 3.7 parts by weight of an aluminum chloride anhydrate, 0.46 part by weight of a sodium chloride and 1 part by weight of a zinc phthalocyanine were mixed at 40° C., and 4.4 parts by weight of a bromine was dropped. Reaction was carried out at 80° C. for 15 hours, and thereafter the reaction mixture was introduced into water so as to precipitate a brominated zinc phthalocyanine crude pigment. By filtrating the water based slurry, washing with hot water of 80° C., and drying at 90° C., 3.0 parts by weight of a refined brominated zinc phthalocyanine crude pigment was obtained. To the brominated zinc phthalocyanine crude pigment, the other components were added by the same composition as in the above-mentioned synthesis example 1 so that a pigment was produced by the same method using a kneader so as to obtain a brominated zinc phthalocyanine pigment (hereinafter it is referred to as the pigment composition (Y)). According to the halogen content analysis by the mass analysis, the obtained brominated zinc phthalocyanine pigment has the average composition $ZnPcBr_{14}Cl_2$ (Pc: phthalocyanine).

Photosensitive Green Composition Example 1

(1) Preparation of the Yellow Pigment Dispersion

In the same manner as in the dispersion example 1 except that the PY83 was used instead of the pigment composition (1), a PY83 pigment dispersion was prepared.

(2) Preparation of the Pigment Dispersion (Y)

Figure 6:
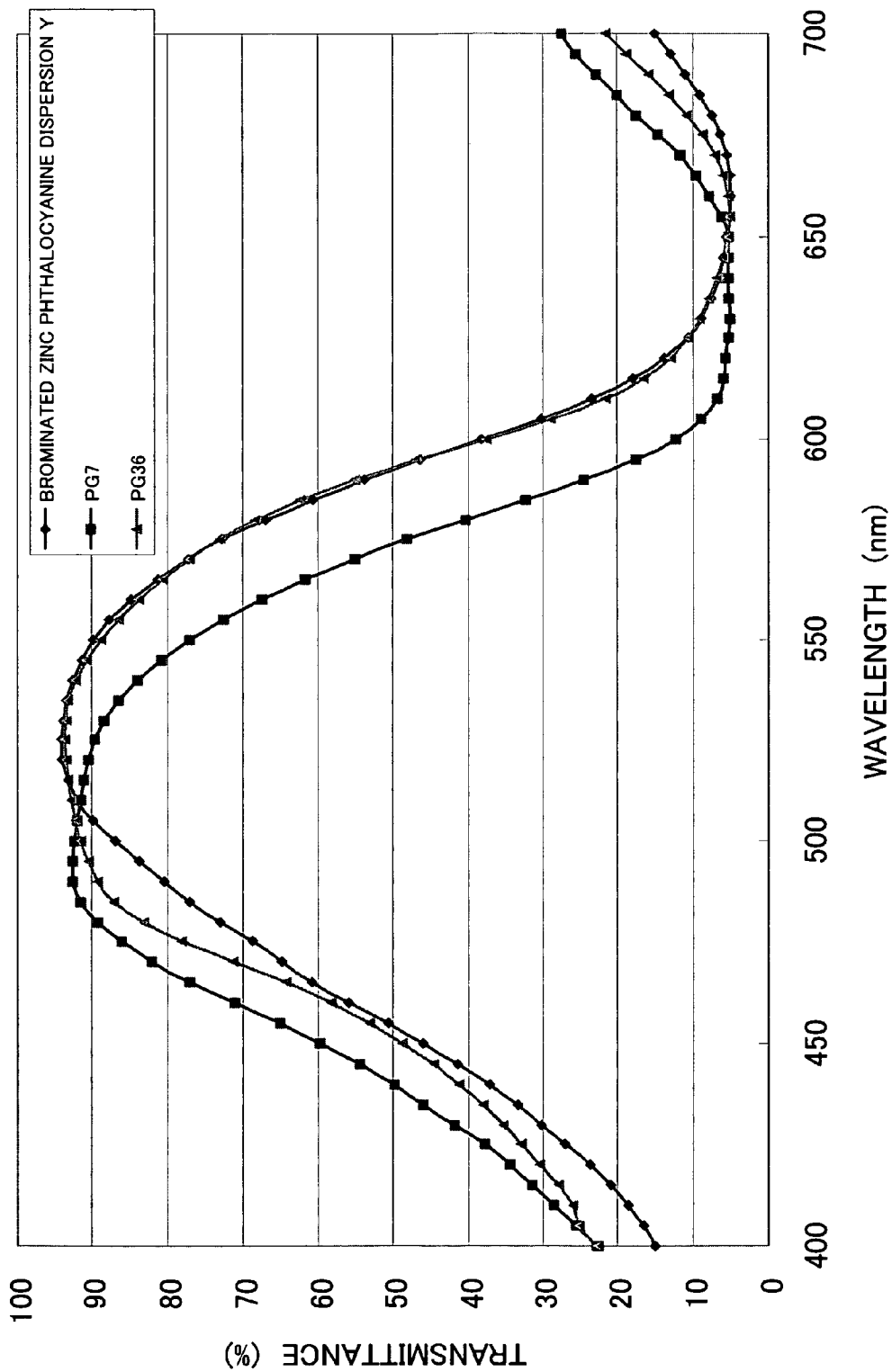
FIG. 6 is a graph showing the single color spectral transmittance spectra of the green pigment capable of expressing the region C and the conventional green pigment.
Figure 7:
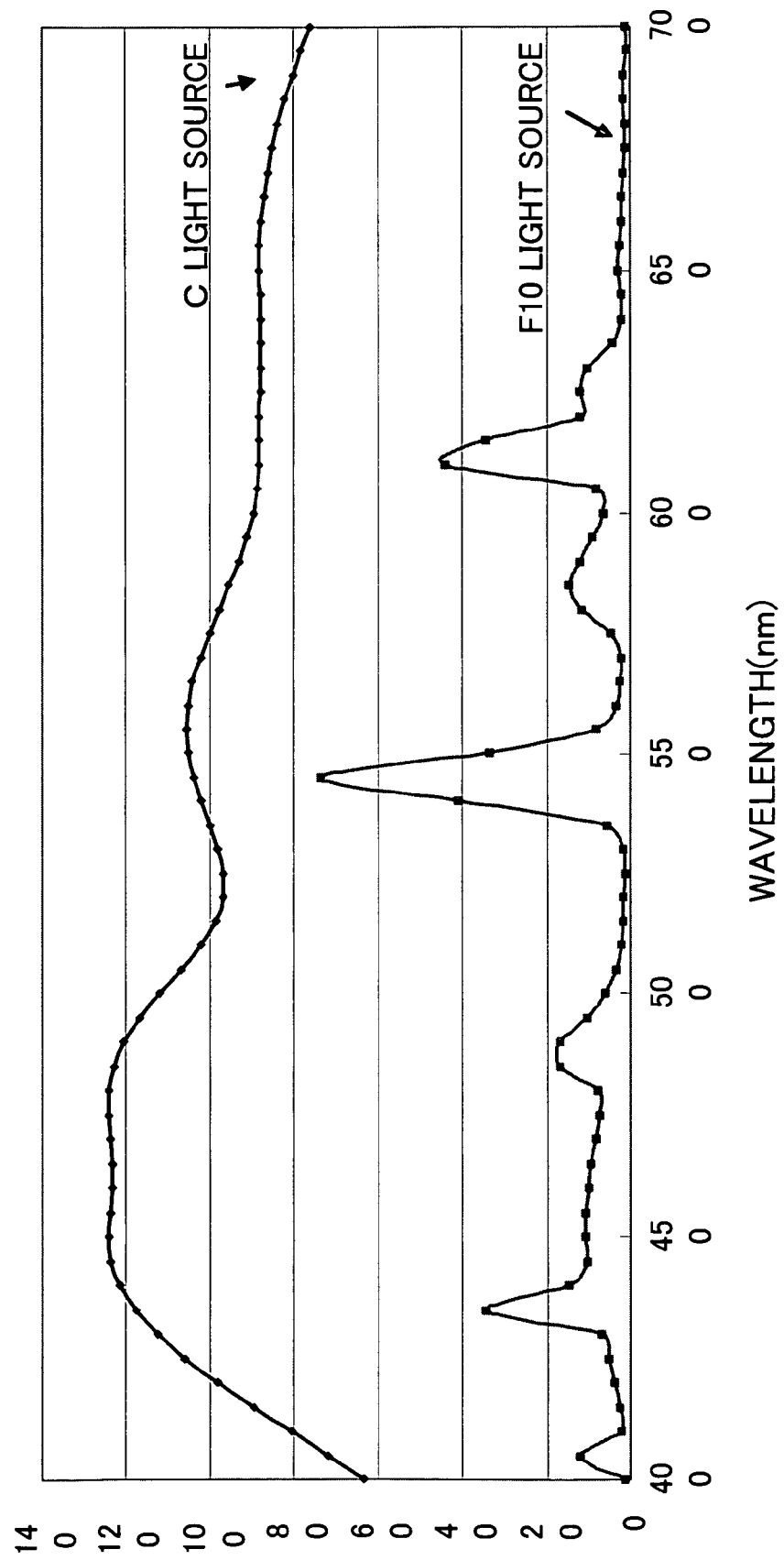
FIG. 7 is a graph showing the wavelength distribution of the F10 light source and the wavelength distribution of the C light source.

In the same manner as in the dispersion example 1 except that the pigment composition (Y) having a stronger yellowish tinge than the green pigment of the present invention was used instead of the pigment composition (1), a pigment dispersion (Y) was prepared. Colorimetry was executed in the same manner as for the pigment dispersion (1) so as to find that x=0.295 at the time y=0.440. Moreover, the single color spectral transmittance spectrum in which a transmittance is 5% at a wavelength (Tmin) having a minimum transmittance is shown in FIG. 6 together with the single color spectral transmittance spectra of the PG7 and the PG36, which are the conventional green pigments.

(3) Preparation of the Photosensitive Green Composition A

For the preparation of an alkaline soluble type photo reactive polymer, 70 parts of a MMA, 15 parts of a BzMA, 15 parts of a MAA and 100 parts of a PGMEA were placed in a flask for the polymerization under the nitrogen atmosphere at 93° C. for 7hours. The solid component concentration of the reaction liquid was adjusted to 40.2% based on the PGMEA. The acidic value of the obtained polymer was 104 mg KOH, and the weight average molecular weight Mw based on the polystyrene was 24,700.

Then, a photosensitive green composition A was prepared by mixing, agitating and filtrating at the room temperature the brominated zinc phthalocyanine pigment dispersion (1), the PY83 pigment dispersion, the alkaline soluble type photo reactive polymer, a dipentaerythritol pentaacrylate (hereinafter, DPPA), IRGACURE 369 (product name) and a PGMEA by the following ratio.

<Composition of the Photosensitive Green Composition A>

| | |
|---|---|
| Brominated zinc phthalocyanine pigment dispersion (1): | 49.00 parts |
| PY83 pigment dispersion: | 8.65 parts |
| Alkaline soluble type photo reactive polymer: | 6.31 parts |
| DPPA (Sartomer SR399E produced by NIPPON KAYAKU CO., LTD.): | 3.26 parts |
| IRGACURE 369 (product name: produced by Chiba Specialty Chemicals, Corp.): | 2.49 parts |
| PGMEA: | 30.29 parts |

Photosensitive Green Composition Examples 2 to 3 and Photosensitive Green Composition Comparative Examples 1 to 4

In the same manner as in the photosensitive green composition example 1 except that the composition components were changed as shown in the Table 2, photosensitive green compositions B to G were prepared.

Photosensitive Green Composition Example 4

(1) Preparation of the Yellow Pigment Dispersion

In the same manner as in the dispersion 1 except that the PY150 was used instead of the pigment composition (1), a PY150 pigment dispersion was prepared.

(2) Preparation of the Photosensitive Green Composition H

A photosensitive green composition H was prepared by agitating and filtrating at the room temperature the brominated zinc phthalocyanine dispersion (1) and the brominated zinc phthalocyanine dispersion (Y), the PY150 pigment dispersion, the same alkaline soluble type photo reactive polymer as in the example 1, a dipentaerythritol pentaacrylate (hereinafter, DPPA), IRGACURE 369 (product name) and a PGMEA by the following ratio.

<Composition of the Photosensitive Green Composition H>

| | |
|---|---|
| Brominated zinc phthalocyanine pigment dispersion (1): | 11.20 parts |
| Brominated zinc phthalocyanine pigment dispersion (Y): | 7.47 parts |
| PY 150 pigment dispersion: | 28.00 parts |
| Alkaline soluble type photo reactive polymer: | 8.16 parts |
| DPPA (Sartomer SR399E produced by NIPPON KAYAKU CO., LTD.): | 4.22 parts |
| IRGACURE 369 (product name: produced by Chiba Specialty Chemicals, Corp.): | 3.21 parts |
| PGMEA: | 37.75 parts |

TABLE 2

Photosensitive color composition Table

| Composition (part by weight) | Exam. 1 (comp. A) | Exam. 2 (comp. B) | Exam. 3 (comp. C) | Compara. Exam. 1 (comp. D) | Compara. Exam. 2 (comp. E) | Compara. Exam. 3 (comp. F) | Compara. Exam. 4 (comp. G) |
|---|---|---|---|---|---|---|---|
| Partially-brominated zinc phthalocyanine dispersion 1 | 49.00 | — | 31.71 | — | — | — | — |
| Partially-brominated zinc phthalocyanine dispersion 2 | — | 52.46 | — | — | — | — | — |
| Chlorinated copper phthalocyanine PG7 dispersion | — | — | — | 30.55 | — | 25.36 | 16.54 |
| Brominated copper phthalocyanine PG36 dispersion | — | — | — | — | 53.61 | 10.38 | 30.73 |
| Brominated zinc phthalocyanine dispersion Y | — | — | 20.18 | — | — | — | — |
| PY 83 pigment dispersion | 8.65 | 5.19 | 5.76 | 27.09 | 4.04 | 21.91 | 10.38 |
| Alkaline soluble photo reactive polymer (solid cont. 40.2%) | 6.31 | 6.31 | 6.31 | 6.31 | 6.31 | 6.31 | 6.31 |
| Dipentaerythritol Pentaacrylate | 3.26 | 3.26 | 3.26 | 3.26 | 3.26 | 3.26 | 3.26 |
| IRGACURE 369 | 2.49 | 2.49 | 2.49 | 2.49 | 2.49 | 2.49 | 2.49 |
| PGMEA | 30.29 | 30.29 | 30.29 | 30.29 | 30.29 | 30.29 | 30.29 |

Photosensitive Green Composition Example 5 and
Photosensitive Green Composition Comparative
Examples 5 to 8

In the same manner as in the photosensitive green composition example 4 except that the composition components were changed as shown in the Table 3, photosensitive green compositions I to M were prepared.

duced by Olympus Corporation. The measurement conditions were a F10 light source as the light source, 20 times of the illumination magnification and the pin hole No. 7 (50 μm).

The film thicknesses of each cured layer so as to have the color evaluation of x=0.257, y=0.693 are shown in the Table 3. The following items were evaluated using the coating layers and the cured layers having the color evaluation of x=0.257, y=0.693.

TABLE 3

Photosensitive green composition Table

| Composition (part by weight) | Exam. 4 (comp. H) | Exam. 5 (comp. I) | Compara. Exam. 5 (comp. J) | Compara. Exam. 6 (comp. K) | Compara. Exam. 7 (comp. L) | Compara. Exam. 8 (comp. M) |
|---|---|---|---|---|---|---|
| Brominated zinc phthalocyanine dispersion 1 | 11.20 | 2.33 | — | — | — | — |
| Brominated zinc phthalacyanine dispersion Y | 7.47 | 21.47 | — | — | — | — |
| Chlorinated copper phthalocyanine PG7 dispersion | — | — | 10.27 | — | 7.93 | 11.67 |
| Brominated copper phthalocyanine PG36 | — | — | — | 23.80 | 14.00 | 4.67 |
| PY 150 pigment Dispersion | 28.00 | 22.87 | 36.40 | 22.87 | 24.73 | 30.33 |
| Alkaline soluble photo reactive polymer (solid cont. 40.2%) | 8.16 | 8.16 | 8.16 | 8.16 | 8.16 | 8.16 |
| Dipentaerythritol Pentaacrylate | 4.22 | 4.22 | 4.22 | 4.22 | 4.22 | 4.22 |
| IRGACURE 369 | 3.21 | 3.21 | 3.21 | 3.21 | 3.21 | 3.21 |
| PGMEA | 37.75 | 37.75 | 37.75 | 37.75 | 37.75 | 37.75 |

D. Formation of the Green Pixel

Green Pixel Examples 1 to 3, Green Pixel
Comparative Examples 1 to 4

Green pixels were produced using the photosensitive green compositions A to C of the examples and the photosensitive green compositions D to G of the comparative examples, and the following items were evaluated. The evaluation results are shown in the Table 3.

(1) Formation of the Green Pixels

The photosensitive green compositions were applied and dried on a 10 cm square glass substrate by a spin coater (produced by MIKASA, type 1H-DX2) so as to form a coating layer. The coating layer was heated on a hot plate at 90° C. for 3 minutes. After the heating operation, an ultraviolet ray was radiated via a photo mask by a UV aligner with a 2.0 kW ultrahigh pressure mercury lamp mounted (produced by DAINIPPON SCREEN MFG. CO., LTD., type MA1200) by a 100 mJ/cm² intensity (based on the 405 nm illuminance). After the ultraviolet ray irradiation, it was developed by a spin developing machine for 1 minute using a 23° C. 0.5% by weight potassium hydroxide aqueous solution, and then washed with pure water for 1 minute and dried. The coating layer was dried by a clean oven (produced by OSHITARI LABORATORY, INC., SCOV-250 Hy-So) at 230° C. for 30 minutes so as to obtain a cured layer.

(2) Color Evaluation

Colorimetry was carried out for the formed color filter pixels by a microscope spectrophotometer OSP-SP200 pro- (3) Hardness, Elastic Deformation Modulus Evaluation The hardness of the obtained cured layer was evaluated by the universal hardness (test load/specific surface area of the Vickers indenter under the test load: N/mm²) at the time of measuring the surface hardness under the conditions with the maximum load of the Vickers indenter of 20 mN, using a super minute hardness meter (WIN-HCU produced by Fischer Instruments K.K).

Moreover, from the deformation amount at the time of the maximum load and the deformation amount after releasing the load to be measured at the same time, the elastic deformation modulus was calculated according to the following formula:

Elastic deformation modulus=100—(deformation amount after releasing the load/deformation amount at the time of the maximum load)×100.

(4) Residue, Sensitivity, Cohesion property, Developing Property and Cross Sectional Shape Evaluation To the coating layers each of which has x=0.257, y=0.693 given by the color evaluation (2) of the cured layers, ultraviolet rays including the wavelengths of 365 nm, 405 nm and 436 nm were radiated by a 300 mJ/cm2 exposure amount using a ultrahigh pressure mercury lamp via a photo mask. In the case of executing the sensitivity evaluation, the exposing amount was fluctuated in a range of 50 to 300 mJ/cm². Thereafter, after developing the substrates for 1 minute by a spin developing machine using a 0.5% by weight potassium hydroxide aqueous solution of 23° C., and then washed with pure water for 1 minute and dried. Thereafter, post baking was carried out for the substrates in a clean oven at 230° C. for 30 minutes so as to produce a pixel array with a pixel pattern arranged on the substrate. The following evaluation was carried out for the obtained green pixels. The results are shown in the Table 4.

<Residue>

The unexposed part of the substrate surface was wiped with a lens cleaner impregnated with an ethanol (product name: TORAYSEE, produced by Toray Industries, Inc.) by 10 times for examining whether or not the lens cleaner was colored, and it was evaluated by the following criteria.

diately sideways was shot by a scanning electron microscope. The magnification was 10,000 times. The lengths of the upper edge and the lower edge of the pixel cross section were measured on the shot photograph so as to find the ratio of the upper edge length with respect to the bottom edge length (upper edge/bottom edge). The obtained ratios were evaluated by the following standards.

○: the ratio was less than 1.
x: the ratio was 1 or more

TABLE 4

| | Green pixel examples | | | | | | |
|---|---|---|---|---|---|---|---|
| Composition (part by weight) | Exam. 1 (comp. A) | Exam. 2 (comp. B) | Exam. 3 (comp. C) | Compara. Exam. 1 (comp. D) | Compara. Exam. 2 (comp. E) | Compara. Exam. 3 (comp. F) | Compara. Exam. 4 (comp. G) |
| Non-reactive component/ reactive component (b/a) ratio | | | | 0.25 | | | |
| Pigment/vehicle Ratio | | | | 0.7 | | | |
| PG7/PG36 Pigment Ratio | — | — | — | — | — | 2.4 | 0.5 |
| Yellow Pigment/ green pigment ratio | 0.2 | 0.1 | 0.1 | 0.9 | 0.1 | 0.6 | 0.2 |
| Chromaticity x value | | | | 0.257 | | | |
| y value | | | | 0.693 | | | |
| Y value | 31.5 | 29.5 | 31.9 | 24.6 | 27.9 | 25.6 | 26.7 |
| Film thickness (μm) | 2.49 | 2.61 | 2.45 | 2.93 | 4.92 | 3.12 | 3.75 |
| Universal hardness (N/mm$^2$) | 630 | 630 | 630 | 550 | 400 | 500 | 450 |
| Elastic deformation modulus (%) | 30 | 30 | 30 | 32 | 20 | 29 | 23 |
| Residue | ○ | ○ | ○ | X | X | X | X |
| Sensitivity | ○ | ○ | ○ | ○ | X | ○ | X |
| Cohesion property | ○ | ○ | ○ | ○ | X | ○ | X |
| Developing property | ◉ | ◉ | ◉ | X | X | X | X |
| Shape | ○ | ○ | ○ | ○ | X | X | X |

○: lens cleaner was not colored at all.
x: lens cleaner was colored.

<Sensitivity>

The minimum exposing amount by which the 20 μm lines and spaces can cohere was measured, and it was evaluated by the following criteria.
○: 20 μm lines were allowed to cohere by 100 mJ/cm$^2$ or less.
x: 20 μm lines did not cohere by 100 mJ/cm$^2$ or less.

<Cohesion Property>

The minimum line width which can cohere without blurring after the developing process was measured in the range of 1 μm to 50 μm lines and spaces, and it was evaluated by the following standards.
○: lines of 10 μm or less were allowed to cohere.
x: lines of 10 μm or less did not cohere.

<Developing Property>

The time for completely dissolving the unexposed part was measured, and it was evaluated by the following standards.
◉: it was dissolved completely by 20 seconds to 40 seconds.
○: it was dissolved completely within 60 seconds.
x: it was not dissolved completely within 60 seconds.

<Cross Sectional Shape>

The pixels produced on the substrates in the examples 1 to 3 and the comparative examples 1 to 4 were cut together with the glass substrates perpendicularly with respect to the lines and spaces, and the cross sectional photograph from imme- The examples 1, 2 using the green pigments according to the present invention have thin film thicknesses of 2.49, 2.61 μm. They are capable of realizing the x coordinate of 0.257 and the y coordinate of 0.693 in the XYZ system of the CIE when the green pixel is solely subjected to colorimetry using a F10 light source, and they have a high transmittance with the stimulus values Y of 31.5, 29.5. Moreover, the example 3, in which the green pigment according to the present invention was used in combination with a green pigment capable of expressing the above-mentioned region C having a stronger yellowish tinge than the green pigment of the present invention, has a further thin film thickness of 2.45 μm. It is capable of realizing the x coordinate of 0.257 and the y coordinate of 0.693 in the XYZ system of the CIE when the green pixel is solely subjected to colorimetry using a F10 light source, and it has a further high transmittance with the stimulus value Y of 31.9. The examples using the green pigment according to the present invention have a thin film thickness, and the excellent pixels in terms of the hardness and the elastic deformation modulus, the residue, the sensitivity, the cohesion property, the developing property and the shape can be obtained.

On the other hand, according to the comparative example 1 using the PG7 as the green pigment, in order to realize the same chromaticity (x, y) as the examples, the yellow pigment needs to be contained more by yellow pigment/green pigment=0.9 so as to have a 2.93 μm film thickness, and the obtained stimulus value Y was 24.6 so as to provide a relatively dark pixel. Moreover, since the film thickness is thick, it is poor in terms of the residue and the developing property.

Moreover, according to the comparative example 2 using the PG 36 as the green pigment, in order to realize the same chromaticity (x, y) as in the examples, the film thickness needs to be as thick as 4.92 μm, and also the transmittance is poorer than the examples 1, 2. Moreover, since the film thickness is thick, it is poor in terms of the hardness and the elastic deformation modulus, the residue, the sensitivity, the cohesion property, the developing property and the shape.

Moreover, according to the comparative examples 3, 4 using in a combination use of the PG7 and the PG36 as the green pigment, in order to realize the same chromaticity (x, y) as in the examples, the film thickness needs to be thick although it is better than the PG36. Also the transmittance is poorer than the examples although it is better than the PG7. Moreover, since the film thickness is thick, it is poor in terms of the residue, the developing property and the shape.

Green Pixel Examples 4, 5, Green Pixel Comparative Examples 5 to 8

Green pixels were produced using the photosensitive green compositions H, I of the examples and the photosensitive green compositions J to M of the comparative examples, and the same items as in the example 1 were evaluated. The film thickness of each cured layer so as to have the color evaluation of X=0.310, y=0.630 are shown in the Table 5. Each item was evaluated using the coating layers and the cured layers having the color evaluation of x=0.310, y=0.630. The evaluation results are shown in the Table 5.

with a weight ratio of the yellow pigment to the green pigment (yellow pigment/green pigment) of 1.6 or less, a xy-chromaticity coordinate region in a range of x coordinate of 0.310 and y coordinate 0.630 in the XYZ system of the CIE when the green pixel is solely subjected to colorimetry using a F10 light source can be expressed. The examples 4, 5 as the photosensitive color composition according to the present invention have a thin film thickness of 1.85 μm and 2.15 μm, and the excellent pixels in terms of the hardness and the elastic deformation modulus, the residue, the sensitivity, the cohesion property, the developing property and the shape can be obtained.

On the other hand, according to the comparative example 5 using the PG7 as the green pigment, in order to realize the same chromaticity (x, y) as the example 4, the yellow pigment needs to be contained more by yellow pigment/green pigment=3.5 so as to have a 2.55 μm film thickness, and the obtained stimulus value Y was 51.0 so as to provide a relatively dark pixel. Moreover, since the film thickness is thick, it is poor in terms of the residue, the cohesion property and the developing property.

Moreover, according to the comparative example 6 using the PG 36 as the green pigment, in order to realize the same chromaticity (x, y) as in the example 4, the film thickness needs to be as thick as 2.83 μm, and also the transmittance is poorer than the examples 1, 2. Moreover, since the film thickness is thick, it is poor in terms of the hardness and the elastic

TABLE 5

| | Green pixel examples | | | | | |
|---|---|---|---|---|---|---|
| Composition (part by weight) | Exam. 4 (comp. H) | Exam. 5 (comp. I) | Compara. Exam. 5 (comp. J) | Compara. Exam. 6 (comp. K) | Compara. Exam. 7 (comp. L) | Compara. Exam. 8 (comp. M) |
| Non-reactive component/ reactive component (b/a) ratio | | | 0.19 | | | |
| Pigment/vehicle Ratio | | | 0.50 | | | |
| PG7/PG36 Pigment Ratio | — | — | — | — | 0.57 | 2.50 |
| Yellow pigment/ green pigment ratio | 1.5 | 1.0 | 3.5 | 1.0 | 1.1 | 1.9 |
| Chromaticity x value | | | 0.310 | | | |
| y value | | | 0.630 | | | |
| Y value | 55.3 | 56.2 | 51.0 | 53.6 | 52.9 | 51.6 |
| Film thickness (μm) | 1.85 | 2.15 | 2.55 | 2.83 | 2.74 | 2.60 |
| Universal hardness (N/mm$^2$) | 600 | 600 | 550 | 400 | 450 | 500 |
| Elastic deformation modulus (%) | 20 | 20 | 23 | 32 | 29 | 26 |
| Residue | ○ | ○ | X | X | X | X |
| Sensitivity | ◎ | ◎ | ○ | X | X | ○ |
| Cohesion property | ○ | ○ | X | X | X | X |
| Developing property | ◎ | ◎ | X | X | X | X |
| Shape | ○ | ○ | ○ | X | X | ○ |

The examples 4, 5 as the photosensitive color compositions according to the present invention have thin film thicknesses of 1.85 μm, 2.15 μm. They are capable of realizing the x coordinate of 0.310 and the y coordinate of 0.630 in the XYZ system of the CIE when the green pixel is solely subjected to colorimetry using a F10 light source, and they have a high transmittance with the stimulus values Y of 55.7, 56.2. Even deformation modulus, the residue, the sensitivity, the cohesion property, the developing property and the shape.

Moreover, according to the comparative examples 7, 8 using in a combination of the PG7 and the PG36 as the green pigment, in order to realize the same chromaticity (x, y) as in the example 4, the film thickness needs to be thick although it is better than the PG36. Also the transmittance is poorer than the examples although it is better than the PG7. Moreover, since the film thickness is thick, it is poor in terms of the residue, the cohesion property and the developing property.

E. Production of the Color Filter

Color Filter Example 1

(1) Formation of the Black Matrix

A 1.0 μm thickness light blocking layer was formed by applying a photosensitive black resin CK-2000 (product name produced by Fuji Hunt Technology, Corp.) onto a 1.1 mm thickness glass substrate (AL material produced by ASAHI GLASS CO., LTD) by a spin coater, drying the same at 100° C. for 3 minutes. After exposing the light blocking layer with a ultrahigh pressure mercury lamp into the light blocking pattern, it was developed with a 0.5 wt % potassium hydroxide aqueous solution. Thereafter, by leaving the substrate for 30 minutes in the 230° C. atmosphere, the heat treatment was applied so as to form a black matrix in a region where the light blocking part should be formed.

(2) Formation of the Colored Layer

Onto the substrate with the black matrix formed as mentioned above, a photosensitive red composition CR-2000 (product name of Fuji Hunt Technology Corp.) was applied by a spin coating method (coating thickness 2.0 μm). Thereafter it was dried for 30 minutes in a 70° C. oven.

Then, with a photo mask disposed by a 100 μm distance from the coating layer of the photosensitive red composition, an ultraviolet ray was radiated for 10 seconds only to the region corresponding to the colored layer forming region using a 2.0 kW ultrahigh pressure mercury lamp by a proximity aligner. Then, alkaline development was carried out by soaking the same for 1 minute in a 0.5 wt % potassium hydroxide aqueous solution (liquid temperature 23° C.) so as to eliminate only the uncured portion of the coating layer. Thereafter, the heat treatment was applied by leaving the substrate in a 230° C. atmosphere for 30 minutes so as to form a red color relief pattern in a region where the red pixel should be formed.

Next, using the above-mentioned photosensitive green composition A, a green color relief pattern was formed in a region where the green pixel should be formed by the same process as in the red color relief pattern formation.

Furthermore, a blue color relief pattern was formed in a region where the blue pixel should be formed in the same process as in the red color relief pattern formation using a photosensitive blue resin composition CB-2000 (product name produced by Fuji Hunt Technology Corp.) to form a colored layer of the three colors including red (R), green (G) and blue (B), thereby obtaining a color filter.

(3) Formation of the Protection Layer

A coating layer having a 2 μm dry film thickness was formed by applying and drying a clear resist (produced by JSR Corporation, product name: Optomer SS6917) by the spin coating method onto the glass substrate with the colored layer formed. With a photo mask disposed by a 100 μm distance from the coating layer, an ultraviolet ray was radiated for 10 seconds only to the region corresponding to the colored layer forming region using a 2.0 kW ultrahigh pressure mercury lamp by a proximity aligner. Then, alkaline development was carried out by soaking the same for 1 minute in a 0.5 wt % potassium hydroxide aqueous solution (liquid temperature 23° C.) so as to eliminate only the uncured portion of the coating layer. Thereafter, by leaving the substrate in a 200° C. atmosphere for 30 minutes, the heat treatment was applied to form a protection layer, thereby obtaining a color filter having the colored layer and the protection layer.

(4) Formation of the Spacer

A coating layer having a 5 μm dry film thickness was formed by applying and drying a columnar resist of the following composition (produced by FUJIFILM OLIN Co., Ltd., product name: Color Mosaic, product No. CK-2000) by the spin coating method onto the glass substrate with the colored layer formed. With a photo mask disposed by a 100 μm distance from the coating layer, an ultraviolet ray was radiated for 10 seconds only to the spacer forming region on the black matrix using a 2.0 kW ultrahigh pressure mercury lamp by a proximity aligner. Then, alkaline development was carried out by soaking the same for 1 minute in a 0.5 wt % potassium hydroxide aqueous solution (liquid temperature 23° C.) so as to eliminate only the uncured portion of the coating layer. Thereafter, the heat treatment was applied by leaving the substrate in a 230° C. atmosphere for 30 minutes to form a fixed spacer, thereby obtaining a color filter having the colored layer and the spacer. The obtained color filter was a color filter having a wide color reproduction range and a high transmittance.

Color Filter Example 2

In the same manner as in the color filter example 1 except that the photosensitive green composition B was used instead of the above-mentioned photosensitive green composition A for forming a green pixel, a color filter having a colored layer and a protection layer, and a color filter having a colored layer and a spacer were obtained.

The obtained color filters were color filters having a wide color reproduction range and a high transmittance.

E. Production of the Liquid Crystal Panel

The color filters obtained in the above-mentioned examples were subjected to the DC magnetron sputtering method with the 200° C. substrate temperature, an argon and oxygen used as the electric discharge gas, and an ITO used as the target to form a transparent electrode layer on a surface including the fixed spacer. Thereafter, an orientation layer made of a polyimide was formed further on the transparent electrode layer.

Then, the above-mentioned color filter and a glass substrate which was formed with a TFT were bonded to each other using an epoxy resin as the sealing material with a 0.3 kg/cm$^2$ pressure applied at 150° C. for assembling a cell. Then a TN liquid crystal was sealed therein to produce a liquid crystal panel of the present invention.

INDUSTRIAL APPLICABILITY

As heretofore explained, since the green pigment according to the present invention can express the color coordinates, which have not been expressed by the conventional green pigments, and they have the excellent color strength as a green color which is not excessively strong in a bluish tinge and a high transmittance, it can be used preferably for forming a green pixel for a color filter. Since a sufficient color development can be obtained by the green pigment according to the present invention with a relatively small amount of the pigment, the use amount of itself can be made smaller as well as the use amount of the yellow pigment or the green pigment having a strong yellowish tinge to be mixed for toning can be made smaller as well, a thin green pixel having a high transparency and the excellent color purity can be formed.

Since the photosensitive color composition according to the present invention uses the above-mentioned green pigment of the present invention, it can get close to the green pixel color defined by each specification by a small pigment use amount. As a result, the film thickness can be made small in the case of forming a pixel for a color filter so that the make-up property in printing is improved and the minute shape can be formed easily by the photolithography. Moreover, a green pixel having a green color developing property with a sufficiently strong yellowish tinge even with a small mixing amount of the yellow pigment and/or a thin green pixel having a high transparency and the excellent color purity can be formed. Furthermore, the color reproduction range can be widened by a thinner film thickness compared with the case of using the conventional green pigments. Moreover, since the green pigment of the present invention has a high transmittance, in the case of forming a green pixel further in a combination with a yellow pixel, the transmittance can be made higher by a thin film thickness compared with the conventional ones also in the region with a high color strength in the color coordinate (high density region). Therefore, in the case of forming a color filter using the photosensitive color composition of the present invention, a color filter having a wide color reproduction range and a high transmittance can be formed. In the case of forming a color filter using the photosensitive color composition according to the present invention, since the light transmission property of the color filter is made higher compared with the case of using the conventional photosensitive color composition which uses the halogenated copper phthalocyanine pigment, a strong back light is not needed any longer so that the cost increase of the liquid crystal panel or the increase of the electric power consumption can be restrained.

In the case the above-mentioned green pigment of the present invention is used further in a combination with a green pigment having a stronger yellowish tinge as a second green pigment, especially in the case it is used in a combination with a green pigment capable of expressing the above-mentioned region C as a second green pigment, the photosensitive color composition according to the present invention can get closer to the green pixel of each specification by a thinner film thickness so that a photosensitive color composition having a high composition ratio of the reactive component and the excellent make-up property in printing can be obtained, and thus a color filter having a wide color reproduction range and a high transmittance can be formed.

Furthermore, according to the photosensitive color composition according to the present invention, the composition ratio of the green pigment and the yellow pigment to be used can be reduced, and thereby the use amount of the dispersing agent can be reduced as well. As a result, the composition ratio of the photosensitive component related to the photo curing reaction can be increased so that a green pixel excellent in terms of various physical properties such as the hardness, the elasticity, the shape and the film thickness evenness can be obtained.

Since a green pixel using the green pigment according to the present invention has a wide color reproduction range, a high transmittance and the excellent physical properties, use of a color filter and a liquid crystal panel, which are provided with such a green pixel and thereby having a high display performance, allows to produce a liquid crystal display apparatus capable of satisfying a region with a high color strength (high density region) of the color coordinates, for example the multi media monitor display specification such as the sRGB and the color television display specifications such as the NTSC and the EBU.

The invention claimed is:

1. A photosensitive color composition for a color filter comprising a reactive substance involving a curing reaction and a coloring substance including a first and a second green pigments, wherein the first green pigment is one selected from the group consisting of green pigments for a color filter each of which is comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source, and wherein the second green pigment is one selected from the group consisting of green pigments for a color filter each of which is comprised of a phthalocyanine green pigment and capable of expressing a region of xy-chromaticity coordinate enclosed by the following Equations 4, 5 and 6 defined by the XYZ color system of the CIE when the green pigment is solely subjected to colorimetry using a F10 light source:

$$y=2.640Xx+0.080 \quad \text{(Equation 1)}$$

wherein a range of "x" in the Equation 1 is $0.180<x<0.230$ $$y=5261.500Xx^4-6338.700Xx^3+2870.400Xx^2-580.730Xx+44.810 \quad \text{(Equation 2)}$$

wherein a range of "x" in the Equation 2 is $0.230<x<0.350$ $$y=-36.379Xx^3+37.410Xx^2-13.062Xx+1.907 \quad \text{(Equation 3)}$$

wherein a range of "x" in the Equation 3 is $0.180<x<0.350$ $$y=8.000Xx-1.513 \quad \text{(Equation 4)}$$

wherein a range of "x" in the Equation 4 is $0.260<x<0.270$ $$y=-1051.300Xx^4+1176.900Xx^3-450.880Xx^2+62.131Xx-0.836 \quad \text{(Equation 5)}$$

wherein a range of "x" in the Equation 5 is $0.260<x<0.350$ $$y=5746.700Xx^4-7310.300Xx^3+3493.200Xx^2-744.610Xx+60.251 \quad \text{(Equation 6)}$$

wherein a range of "x" in the Equation 6 is $0.270<x<0.350$.

2. The photosensitive color composition for a color filter according to claim 1 wherein the first green pigment has a wavelength (Tmax) within a range of 500 to 520 nm at which a maximum transmittance in a spectrum of a spectral transmittance between 380 and 780 nm is provided, and wherein the second green pigment has a wavelength (Tmax) within a range of 520 to 535 nm at which a maximum transmittance in a spectrum of a spectral transmittance between 380 and 780 nm is provided.

3. The photosensitive color composition for a color filter according to claim 1 wherein a central metal of the phthalocyanine green pigment in the first green pigment is the same as that in the second green pigment.

4. The photosensitive color composition for a color filter according to claim 1 wherein the first green pigment and the second green pigment are brominated zinc phthalocyanines.

5. The photosensitive color composition for a color filter according to claim 4 wherein the brominated zinc phthalocyanine of the first green pigment contains less than 13 bromines on average per one molecule, and wherein the brominated zinc phthalocyanine of the second green pigment contains 13 or more bromines on average per one molecule.

6. The photosensitive color composition for a color filter according to claim 4 wherein each of the brominated zinc phthalocyanines has a mean primary particle size within 0.01 to 0.1 μm.

7. The photosensitive color composition for a color filter according to claim 1 wherein a weight ratio (b/a) of a non reactive substance (b) other than the coloring substance to the reactive substance (a) is 0.45 or less.

8. The photosensitive color composition for a color filter according to claim 1 wherein a ratio expressed by pigment/vehicle is in a range of 0.25 to 1.0.

9. The photosensitive color composition for a color filter according to claim 1 wherein at least one yellow pigment is further contained as the coloring substance.

10. The photosensitive color composition for a color filter according to claim 9 wherein a green pigment including the green pigment for a color filter and the yellow pigment are contained at 1.6 or less in a weight ratio (yellow pigment/green pigment) of the yellow pigment to the green pigment.

11. A color filter provided with a green pixel which is formed using the photosensitive color composition for a color filter according to claim 1.

12. The color filter according to claim 11 wherein the green pixel has a thickness of 2.7 μm or less and is capable of expressing a color space ranging $0.21 \leq x \leq 0.30$ in a x-coordinate, $0.55 \leq y \leq 0.71$ in a y-coordinate and $29 \leq Y$ in a stimulus value "Y" defined by the XYZ color system of the CIE when the green pixel is solely subjected to colorimetry using a F10 light source.

13. The color filter according to claim 11 wherein the green pixel comprising the green pigment for a color filter further contains at least a yellow pigment at 1.6 or less in a weight ratio (yellow figment/green pigment) of the yellow pigment to the green pigment for a color filter, and is capable of expressing a region of xy-chromaticity coordinate ranging $0.21 \leq x \leq 0.30$ in a x-coordinate and $0.55 \leq y \leq 0.71$ in a y-coordinate defined by the XYZ color system of the CIE when the green pixel is solely subjected to colorimetry using a F10 light source.

14. The color filter according to claim 11 wherein the green pixel has 500 N/mm² or more of hardness or 20% or more of elastic deformation.

15. The color filter according to claim 11 wherein a section obtained from the green pixel has an upper edge and a bottom edge with a ratio in length of an upper edge to a bottom edge being less than 1.

16. A liquid crystal panel wherein the color filter according to claim 11 and a substrate as a side driving liquid crystal is disposed by facing them to each other, and a liquid crystal is sealed in a gap between them.

17. A color filter provided with a green pixel which is formed using a photosensitive color composition for a color filter comprising a reactive substance involving a curing reaction and a coloring substance including a first and a second green pigments, wherein the first green pigment is one selected from the group consisting of green pigments for a color filter each of which is comprised of a phthalocyanine green pigment and capable of expressing a region of xy-chromaticity coordinate enclosed by the following Equations 1, 2 and 3 defined by the XYZ color system of the CIE when the green pigment is solely subjected to colorimetry using a F10 light source, and wherein the second green pigment is one selected from the group consisting of green pigments for a color filter each of which is comprised of a phthalocyanine green pigment and capable of expressing a region of xy-chromaticity coordinate enclosed by the following Equations 4, 5 and 6 defined by the XYZ color system of the CIE when the green pigment is solely subjected to colorimetry using a F10 light source:

$$y=2.640Xx+0.080 \quad \text{(Equation 1)}$$

wherein a range of "x" in the Equation 1 is $0.180<x<0.230$ $$y=5261.500Xx^4-6338.700Xx^3+2870.400Xx^2-580.730Xx+44.810 \quad \text{(Equation 2)}$$

wherein a range of "x" in the Equation 2 is $0.230<x<0.350$ $$y=-36.379Xx^3+37.410Xx^2-13.062Xx+1.907 \quad \text{(Equation 3)}$$

wherein a range of "x" in the Equation 3 is $0.180<x<0.350$ $$y=8.000Xx-1.513 \quad \text{(Equation 4)}$$

wherein a range of "x" in the Equation 4 is $0.260<x<0.270$ $$y=-1051.300Xx^4+1176.900Xx^3-450.880Xx^2+62.131Xx-0.836 \quad \text{(Equation 5)}$$

wherein a range of "x" in the Equation 5 is $0.260<x<0.350$ $$y=5746.700Xx^4-7310.300Xx^3+3493.200Xx^2-744.610Xx+60.251 \quad \text{(Equation 6)}$$

wherein a range of "x" in the Equation 6 is $0.270<x<0.350$.

18. The color filter according to claim 17 wherein the green pixel has a thickness of 2.5 μm or less and is capable of expressing a color space ranging $0.25 \leq x \leq 0.32$ in a x-coordinate, $0.55 \leq y \leq 0.75$ in a y-coordinate and $30 \leq Y$ in a stimulus value "Y" defined by the XYZ color system of the CIE.

19. The color filter according to claim 17 wherein the green pixel contains a green pigment including the first and the second green pigments and a yellow pigment at 1.6 or less in a weight ratio (yellow pigment/green pigment) of the yellow pigment to the green pigment, and is capable of expressing a region of xy-chromaticity coordinate ranging $0.25 \leq x \leq 0.32$ in a x-coordinate and $0.55 \leq y \leq 0.75$ in a y-coordinate defined by the XYZ color system of the CE when the green pixel is solely subjected to colorimetry using a F10 light source.

20. The color filter according to claim 17 wherein the green pixel has 500 N/mm² or more of hardness or 20% or more of elastic deformation.

21. The color filter according to claim 17 wherein a section obtained from the green pixel has an upper edge and a bottom edge with a ratio in length of an upper edge to a bottom edge being less than 1.

22. A liquid crystal panel wherein the color filter according to claim 17 and a substrate as a side driving liquid crystal is disposed by facing them to each other, and a liquid crystal is sealed in a gap between them.

* * * * *